United States Patent
Yano et al.

(10) Patent No.: US 7,712,499 B2
(45) Date of Patent: May 11, 2010

(54) PNEUMATIC RADIAL TIRE WITH SPECIFIED BELT LAYER

(75) Inventors: Takeshi Yano, Kodaira (JP); Hiroyuki Mori, Kodaira (JP); Masaaki Nakamura, Kodaira (JP); Seiji Itai, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1142 days.

(21) Appl. No.: 10/502,548

(22) PCT Filed: Jan. 24, 2003

(86) PCT No.: PCT/JP03/00661

§ 371 (c)(1),
(2), (4) Date: Mar. 21, 2005

(87) PCT Pub. No.: WO03/061991

PCT Pub. Date: Jul. 31, 2003

(65) Prior Publication Data

US 2005/0194081 A1    Sep. 8, 2005

(30) Foreign Application Priority Data

Jan. 24, 2002    (JP)    ............................. 2002-015701

(51) Int. Cl.
*B60C 9/08*    (2006.01)
*B60C 9/18*    (2006.01)
*B60C 9/20*    (2006.01)
*B60C 9/22*    (2006.01)

(52) U.S. Cl. .................. 152/527; 152/526; 152/531; 152/532; 152/533; 152/534; 152/535; 152/536; 152/556; 152/557

(58) Field of Classification Search ................. 152/526, 152/527, 531–535, 536, 556, 557
See application file for complete search history.

(56) References Cited

U.S. PATENT DOCUMENTS

| 4,216,813 | A |   | 8/1980 | Kersker et al. |
|---|---|---|---|---|
| 4,887,655 | A | * | 12/1989 | Imai et al. .................. 152/531 |
| 4,934,428 | A | * | 6/1990 | Aoki et al. .................. 152/532 |
| 6,116,311 | A | * | 9/2000 | Ueyoko et al. ............. 152/531 |
| 2002/0005239 | A1 |   | 1/2002 | Royer et al. |

FOREIGN PATENT DOCUMENTS

| JP | 61-71204 A | 4/1986 |
|---|---|---|
| JP | 61-178204 A | 8/1986 |
| JP | 62-37204 A | 2/1987 |
| JP | 63-49504 A | 3/1988 |
| JP | 5-193303 A | 8/1993 |
| JP | 5294107 A | 11/1993 |
| JP | 6-211003 A | 8/1994 |
| JP | 8-58310 A | 3/1996 |
| JP | 2000-255209 A | 9/2000 |

* cited by examiner

*Primary Examiner*—Adrienne C Johnstone
(74) *Attorney, Agent, or Firm*—Sughrue Mion, PLLC

(57) ABSTRACT

In the pneumatic radial tire of the present invention, a total strength K0 of a belt layer 20 in a circumferential direction of the tire per unit of width at a tire equator surface position P0 is set greater than a total strength of the belt layer 20 in the circumferential direction of the tire per unit of width at a width position P2 corresponding to ⅔ of a maximum width of the belt layer having the tire equator surface CL as a center.

23 Claims, 23 Drawing Sheets

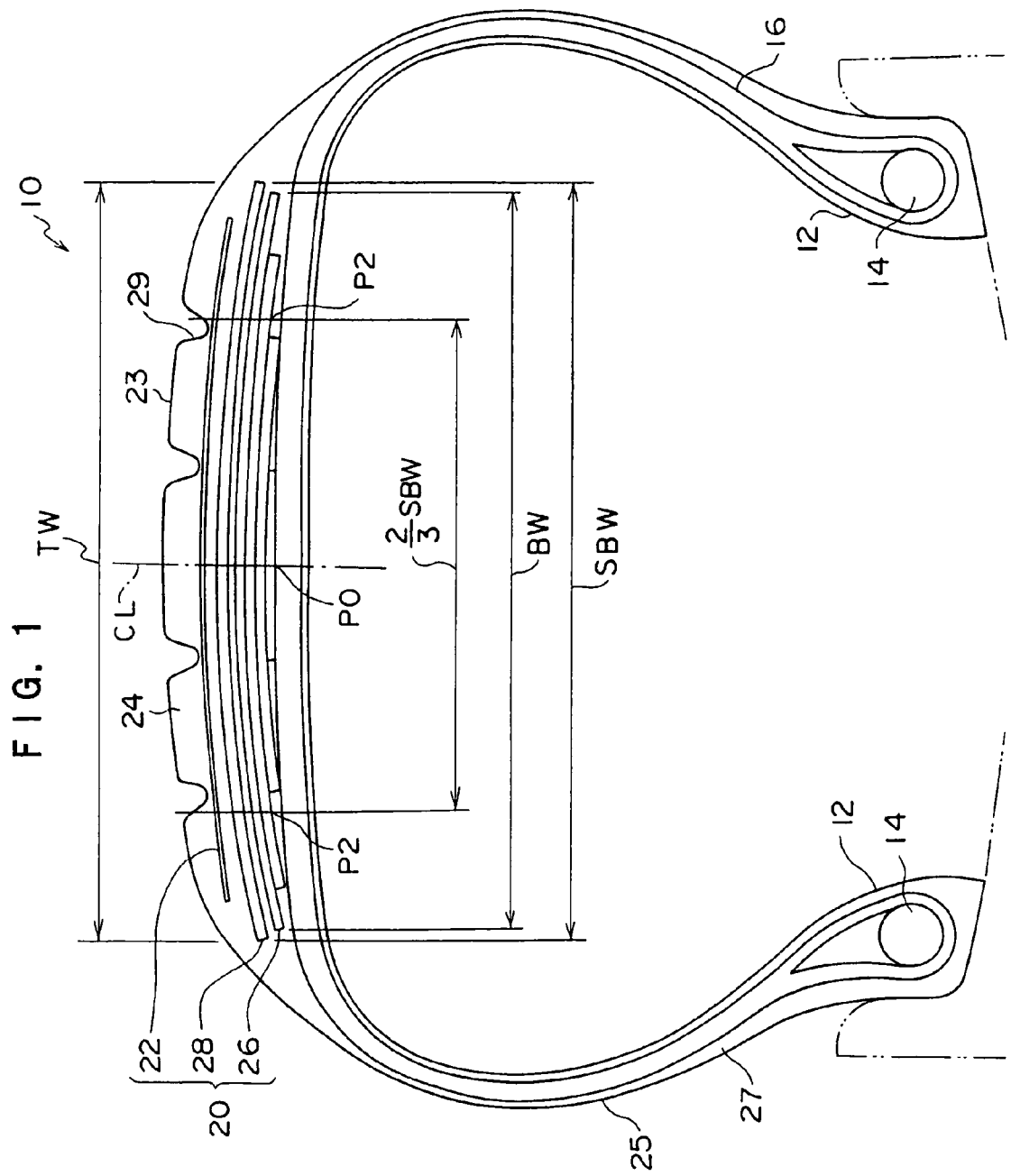

F I G. 5
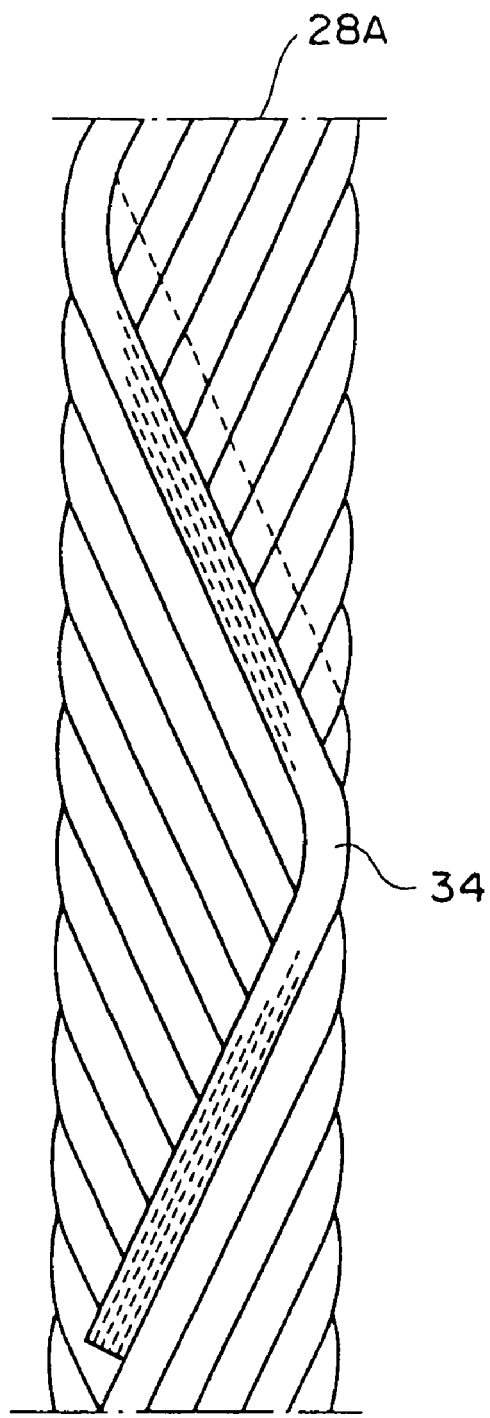

F I G. 14
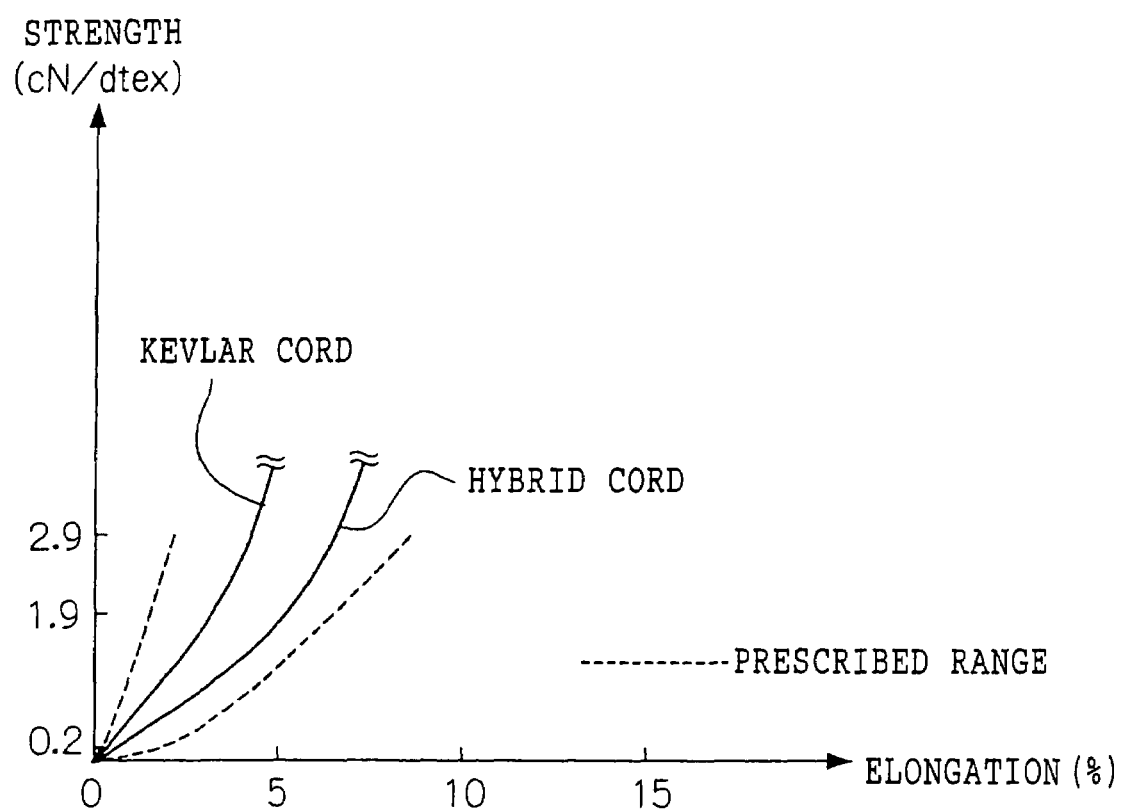

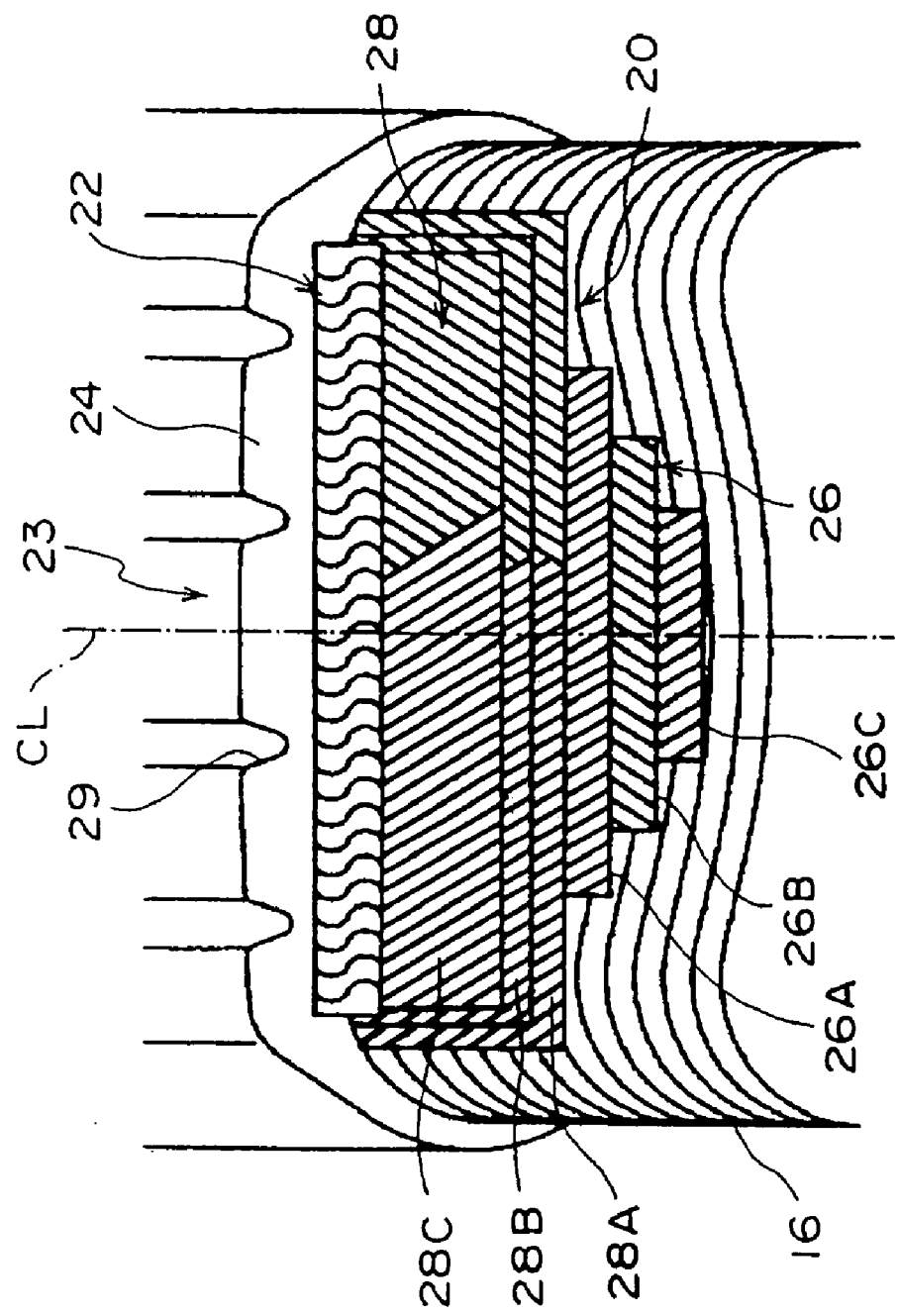
FIG. 20 COMPARATIVE

PNEUMATIC RADIAL TIRE WITH SPECIFIED BELT LAYER

FIELD OF THE INVENTION

The present invention relates to a pneumatic radial tire and a producing method of the pneumatic radial tire, and more particularly, to a pneumatic radial tire and a producing method of the pneumatic radial tire which are suitable for an aircraft and which can enhance against cutting by foreign matter and the like, and can reduce a weight of the tire.

BACKGROUND ART

A conventional pneumatic radial tire, especially an aircraft radial tire has a large swell of a tread surface in its radial direction by a high internal pressure and a centrifugal force caused by high speed rotation.

If the tread surface swells in the radial direction, a tread rubber is expanded in a circumferential direction of the tire.

Generally, the aircraft radial tire is used under conditions of high internal pressure and high load. Therefore, when the tire rides over foreign matter, the aircraft radial tire is poor in properties by which a tread thereof is not damaged when the entire tire rides over the foreign matter, i.e., so-called "enveloping properties". In a state in which the tread rubber of the tire is expanded in the circumferential direction of the tire, a resistance force against the foreign matter becomes weak, and there is a problem that the trampled foreign matter easily enters the tread, and the tire is prone to be damaged.

When an amount of swell of the central portion of the tire in its widthwise direction becomes greater than opposite ends of the tire in the widthwise direction, a diameter difference is generated. This diameter difference causes a drag phenomenon to the rotating tire, a shoulder portion is worn earlier than the central portion of the tire, and the lifetime of the tire is shortened. This phenomenon is called a deviated wear.

In a conventional radial tire using a relatively low elastic cord as a belt layer a width of a main portion of a crown reinforcing ply layer is equal to a ground-contacting width, and belt layers which are adjacent to each other inner side and outer side in the radial direction of the tire are laminated on one another with extremely small steps interposed therebetween in most of cases (see JP-A No. 5-193306).

In order to improve the wearing characteristics of the tread by suppressing the swelling deformation thereof, to enhance the wearing characteristics of the tread, and to enhance the enveloping properties, a pneumatic radial tire 102 shown in a transverse cross section in FIG. 22 is considered. In the pneumatic radial tire 102, a belt layer 20 disposed between a tread rubber layer 24 and a crown region of a carcass layer 16 comprises a conventional main belt layer 26 comprising wide belt ply, and an auxiliary belt layer 28 which is added on an outer periphery of the main belt layer 26 and which comprises narrow belt ply. With this structure, the belt rigidity is enhanced by the auxiliary belt layer 28 disposed on a central portion of the main belt layer 26, and especially the swelling deformation of the tread central region is restrained.

In order to suppress the swell caused by the internal pressure of the central portion in the widthwise direction of the tire, in a conventional simple method, a ply cord is replaced by a cord which has relatively high elasticity and which is made of aromatic polyamide (see Japanese Patent Application Laid-open (JP-A) No. 61-178204).

As compared with an aliphatic polyamide which is conventionally used for an aircraft tire, the aromatic polyamide cord exhibits high tension also in a low elongation percentage region and maintains the internal pressure. Therefore, the swell of the tire can effectively be suppressed.

As a conventional technique for enhancing an anti-cut separation performance, a pneumatic radial tire in which a narrow reinforcing layer (cord is made of steel) is additionally disposed in the belt is proposed (see JP-A No. 8-58310).

As another conventional technique, there is proposed a pneumatic radial tire in which a reinforcing layer comprising cords which are reinforced by strong cords such as glass, metal, aramid or the like is provided on an outermost layer of a belt made of organic fiber (see U.S. Pat. No. 4,216,813).

In these conventional techniques, a belt having higher tension is further added.

According to the conventional technique as shown in FIG. 22, however, by securing a necessary rubber thickness H (thickness of rubber only and thickness of cord is not included) in the tread central region where the total thickness of the belt layer becomes most thick, there are problems that a rubber thickness $H_0$ of the tread side region becomes excessively thick and thus, the tire weight is increased forcibly, a heating value of the tread side region is increased and thus, the high speed endurance is lowered.

In the conventional belt structure, only by using a relatively high elastic cord in the belt ply, performance in which the cord characteristics are sufficiently exhibited can not be obtained, and it is difficult to reduce the weight of members to be used as light as possible.

First of all, the number of belts of an aircraft tire is high, and it is not preferable to further increase the number of belts, and since a centrifugal force is applied when the tire rotates, it is preferable to reduce the weight of the tread portion.

Thus, in order to meet these requirements, it is absolutely necessary to employ a belt disposition without waste and a structure in which characteristics of the cord can be utilized.

In view of the above circumstances, it is an object of the invention to provide a pneumatic radial tire suitable for an aircraft in which a diameter of the tread surface is prevented from being increased, endurance against cutting occurred by foreign matter or the like is enhanced, and the weight of the tire is reduced.

DISCLOSURE OF THE INVENTION

The present inventor researched a tension load of a belt layer in detail and as a result, as shown in a graph in FIG. 12, it was found that the load has distribution as shown with a chain line under no load of 100% internal pressure (TRA prescribed internal pressure). Note that, in FIG. 12, a vertical axis shows the tension, a lateral axis shows a position in a belt widthwise direction, and SBW shows a maximum width of the belt layer.

In the case of an aircraft tire, pressure resistance of 400% of the prescribed internal pressure is absolutely necessary. A tension when the internal pressure of 400% was charged was researched and as a result, the distribution is as shown with a solid line.

When a load was applied, the tension distribution of the belt layer was as shown with two-dot chain line.

From the above facts, it can be noticed that the belt layer needs to have strength which satisfies both the conditions.

From various experiments and researches, the inventor found that if a strength of an equator surface was set greater than a strength at a ⅔ position of the maximum width of the belt layer it was possible to prevent the diameter from being increased and to reduce the weight.

One aspect of the invention has been accomplished in view of the above circumstances, and the present aspect of the invention provides a pneumatic radial tire comprising a pair of bead cores, a carcass layer comprising one or more carcass plies extending from one of the bead cores to the other bead core in a toroidal form, and a belt layer comprising at least one belt ply including an organic fiber cord on an outer peripheral surface of a crown region on an outer side of the carcass layer in a radial direction of the tire, wherein when a total strength of the belt layer in a circumferential direction of the tire per unit of width at a tire equator surface position P0 is defined as K0 and a total strength of the belt layer in the circumferential direction of the tire per unit of width at a width position P2 corresponding to ⅔ of a maximum width of the belt layer having the tire equator surface as a center is defined as K2, a relation of K2<K0 is satisfied.

Next, the effect of the pneumatic radial tire will be described.

In the pneumatic radial tire the total strength K0 of a belt layer in a circumferential direction of the tire per unit of width at a tire equator surface position P0 is set greater than the total strength of the belt layer in the circumferential direction of the tire per unit of width at a width position P2 corresponding to ⅔ of a maximum width of the belt layer around a tire equator surface CL. With this structure, it is possible to suppress the amount of material of the belt layer and to suppress the amount of expansion of a tread rubber in a tread central region in the circumferential direction thereof when a standard internal pressure is charged and when the tire is rotated at high speed, and to suppress the growth of tire diameter.

Since the expansion amount of the tread rubber in the circumferential direction is suppressed, the tension of the rubber is reduced. Therefore, it is possible to increase the resistance of the tread against the sticking of foreign matter, and even when foreign matter sticks, it is possible to suppress the growth of the crack.

(Definition of Total Strength)

The term "total strength" is a strength of the belt layer in the circumferential direction thereof, and is obtained by multiplying strength of one cord by the number of cords per unit width (here, 10 mm).

Note that the total strength when the cord is inclined at an angle θ with respect to the circumferential direction is calculated by multiplying the total strength per unit width by cosθ.

Further, when the cord in the tire extends in a waved shape (zigzag shape) in the circumferential direction of the tire, the strength is not calculated by stretching the cord straightly, but is calculated in the form as the cord is embedded within the tire i.e., as when the waved cord which is molded in the waved manner is elongated in the circumferential direction.

In one aspect of the invention, in the pneumatic radial tire according to claim 1, a relation of 0.2≦K2/K0≦0.8 is satisfied.

Next, the effect of the pneumatic radial tire of this aspect will be described.

If the strength ratio K2/K0 becomes lower than 0.2, excessive tension is applied to the organic fiber cord located in the vicinity of the shoulder portion and there is an adverse possibility that the pressure tightness performance is deteriorated.

If the strength ratio K2/K0 exceeds 0.8, the organic fiber cord of the belt ply disposed at the ⅔ point is not effectively utilized, and the weight of the pneumatic radial tire is increased.

Thus, it is preferable that the strength ratio K2/K0 satisfies 0.2≦K2/K0≦0.8.

In one aspect of the invention, a laminated layer thickness of the organic fiber cord in the belt layer is made to be greatest at the tire equator surface position P0, and when the laminated layer thickness of the organic fiber cord at the tire equator surface position P0 is defined as G0 and a laminated layer thickness of the organic fiber cord at the width position P2 corresponding to ⅔ of the maximum width of the belt layer is defined as G2, a relation of G2<G0 is satisfied.

Next, the effect of the pneumatic radial tire of this aspect will be described.

If the laminated layer thickness G2 of the organic fiber cord at the width position P2 corresponding to ⅔ of the maximum width of the belt layer is set greater than the laminated layer thickness G0 of the organic fiber cord at-the tire equator surface position P0, the relation of K2<K0 can be easily achieved.

Note that the laminated layer thickness of the organic fiber cord is a total diameter size of the organic fiber cords which are laminated in the radial direction of the tire when the belt layer is seen in the sectional view in the radial direction of the tire. For example, when 12 organic fiber cords each having a diameter A are laminated on one another, the laminated layer thickness is A×12.

In one aspect of the invention, in the pneumatic radial tire of claim 3, a relation of 0.35≦G2/G0≦0.85 is satisfied.

Next, the effect of the pneumatic radial tire of this aspect will be described.

If the ratio G2/G0 of the laminated layer thickness of the organic fiber cord becomes lower than 0.35, excessive tension is applied to the organic fiber cord located in the vicinity of the shoulder portion and there is an adverse possibility that pressure tightness performance is deteriorated.

If the ratio G2/G0 of the laminated layer thickness of the organic fiber cord exceeds 0.85, the organic fiber cord of the belt ply disposed at the ⅔ point is not effectively utilized, and the weight of the pneumatic radial tire is increased.

Thus, it is preferable that the ratio G2/G0 of the laminated layer thickness of the organic fiber cord satisfies 0.35≦G2/G0≦0.85.

In one aspect of the invention, in the pneumatic radial tire, in the belt layer, when the laminated layer thickness of the organic fiber cord at the width position P2 corresponding to ⅔ of the maximum width of the belt layer is defined as G2, the belt layer is provided with a portion having a laminated layer thickness which is thicker than the laminated layer thickness G2 in a region at an outer side of the width position P2 corresponding to ⅔ of the maximum width of the belt layer in the widthwise direction of the tire.

Next, the effect of the pneumatic radial tire of this aspect will be described.

If a portion having a laminated layer thickness which is thicker than the laminated layer thickness G2 in a region at the outer side in the tire widthwise direction of the width position P2 corresponding to ⅔ of the maximum width of the belt layer is provided, when the tire is exposed to external force in the widthwise direction of the tire at the time of high speed running, the large tension variation of the opposite sides of the tire can be absorbed, and it is possible to effectively prevent the generation of a standing wave which largely reduces the lifetime of the pneumatic radial tire.

In one aspect of the invention, in the pneumatic radial tire, the belt layer comprises a main belt layer having at least two belt plies including an organic fiber cord having a tensile fracture strength of 6.3 cN/dtex or higher, an elongation percentage of 0.2 to 2.0% when 0.3 cN/dtex load is applied in an elongating direction, an elongation percentage of 1.5 to 7.0% when 2.1 cN/dtex load is applied in the elongating direction, and an elongation percentage of 2.2 to 9.3% when 3.2 cN/dtex load is applied in the elongating direction.

Next, the effect of the pneumatic radial tire of this aspect will be described.

If the strength distribution of the belt layer is defined as in the present invention, the diameter growth can be suppressed and the weight of the tire can be reduced. However, if the low elastic cord such as nylon is used, it is necessary to laminate the cords in many layers to suppress the diameter growth, and the weight of the tire is increased.

In the pneumatic radial tire of this aspect, the main belt layer comprises at least two belt plies including high elastic organic fiber cord in which the tensile fracture strength is 6.3 cN/dtex or higher. With this, necessary pressure tightness performance can be satisfied.

Here, elongation percentage is 1.5 to 7.0% when 2.1 cN/dtex load is applied in the elongating direction, and elongation percentage is 2.2 to 9.3% when 3.2 cN/dtex load is applied in the elongating direction. With this, the diameter growth can be easily suppressed.

This is because that in the case of the pneumatic radial tire for an aircraft, a cord tension of about 2.1 cN/dtex is applied when a standard internal pressure load is applied, and a cord tension of about 3.2 cN/dtex is applied at the time of high speed traveling, but if the elongation percentage of the organic fiber cord exceeds the above range, the swelling of the tire in the radial direction can not be effectively suppressed when the internal pressure is charged into the tire, and the resistance against the sticking of foreign matter can not be expected.

On the other hand, if the elongation percentage of the organic fiber cord is lower than the above range, since the hoop effect of the belt ply is excessively great, the carcass layer swells in the widthwise direction of the tire more than necessary and this is not preferable.

Further, the reason why the elongation percentage when 0.3 cN/dtex load is applied in the elongating direction of the organic fiber cord is set to 0.2 to 2.0% is as follows.

First, in the case of the aircraft pneumatic radial tire, when the pneumatic radial tire is subjected to vulcanization, the tire outer diameter is usually set such that a green tire is expanded by about 0.2 to 2.0% in a tire mold.

This is because that the tire is uniformly expanded by a pressure applied from the interior of the green tire at the time of vulcanization, thereby neatly arranging the directions of the cords, and correcting the variation of cord drivings.

In this procedure, a relatively small tension as small as about 0.3 cN/dtex is applied to the organic fiber cord, but if the elongation percentage of the organic fiber cord is greater than 2.0%, the correcting effect of the cord characteristics is small, and if the elongation percentage is smaller than 0.2%, the cord tension becomes great when the tire is expanded at the time of vulcanization, and there is an inconvenience that the organic fiber cord bites into an inner rubber in the radial direction of the tire.

(Definition when Standard Internal Pressure is Applied)

Note that the internal pressure and the load employed herein are those prescribed in TRA YEAR BOOK, 2002.

For example, in the case of an aircraft radial tire 1270×455R22 32PR, the prescribed internal pressure is 1620 kPa, and a prescribed load is 24860 kg.

It is preferable that the organic fiber cord has elongation percentage of 0.2 to 1.5% when 0.3 cN/dtex load is applied in the elongating direction, elongation percentage of 1.5 to 6.5 when 2.1 cN/dtex load is applied in the elongating direction, and elongation percentage of 2.2 to 8.3% when 3.2 cN/dtex load is applied in the elongating direction.

In one aspect of the invention, in the pneumatic radial tire of claim 6, at least two belt layers are laminated at an end portion of the main belt layer in the widthwise direction of the tire.

Next, the effect of the pneumatic radial tire of this aspect will be described.

If the two belt plies are laminated in the end portion of the main belt layer in the widthwise direction of the tire, even under a condition in which strong tension variation is caused in the organic fiber cord in the vicinity of opposite ends of the tire in the ground-contacting surface in the widthwise direction as in a case in which external force is applied in the widthwise direction of the tire during the running, the impact can be effectively dispersed while exhibiting resilience, and the reliability of the pneumatic radial tire under a severe using condition is enhanced.

In one aspect of the invention, in the pneumatic radial tire, the main belt layer has a belt ply including an organic fiber cord which is formed of aromatic polyamide fiber and has an inner-layer coefficient of 0.12 to 0.85 and an outer-layer coefficient of 0.40 to 0.80.

Next, the effect of the pneumatic radial tire of this aspect will be described.

If the organic fiber cord constituting the main belt layer is made of aromatic polyamide fiber, the inner-layer coefficient is set to 0.12 to 0.85, more preferably to 0.17 to 0.51, and the outer-layer coefficient is set to 0.40 to 0.80, it is possible to obtain the properties in which the belt layer comprises a main belt layer having at least two belt plies including an organic fiber cord, the organic fiber cord has a tensile fracture strength of 6.3 cN/dtex or higher, an elongation percentage of 0.2 to 2.0% when 0.3 cN/dtex load is applied in an elongating direction, an elongation percentage of 1.5 to 7.0% when 2.1 cN/dtex load is applied in the elongating direction, and an elongation percentage of 2.2 to 9.3% when 3.2 cN/dtex load is applied in the elongating direction.

(Definition of Lay coefficient)

The lay coefficient is calculated from the following equation:

$$NT = N \times (0.139 \times D/\rho)^{1/2} \times 10^{-3}$$

N: the number of lays per 100 mm of organic fiber cord

"D" of inner-layer: the number of denier of thread to be inner-laid

"D" of outer-layer: the number of denier of entire cords /2

$\rho$: specific gravity (g/cm$^3$) of organic fiber cord

In one aspect of the invention, in the pneumatic radial tire, the main belt layer has a belt ply including an organic fiber cord which includes aromatic polyamide fiber and aliphatic polyamide fiber, and a weight ratio of the aromatic polyamide fiber and the aliphatic polyamide fiber is from 100:10 to 100:170.

Next, the effect of the pneumatic radial tire of this aspect will be described.

Forming the organic fiber cords, which form the main belt layer, with aromatic polyamide fiber and aliphatic polyamide fiber, and setting the weight ratio of the aromatic polyamide fiber and the aliphatic polyamide fiber from 100:10 to 100:170, it is possible to obtain the properties in which the organic fiber cord has a tensile fracture strength of 6.3 cN/dtex or higher, an elongation percentage of 0.2 to 2.0% when 0.3 cN/dtex load is applied in an elongating direction, an elongation percentage of 1.5 to 7.0% when 2.1 cN/dtex load is applied in the elongating direction, and an elongation percentage of 2.2 to 9.3% when 3.2 cN/dtex load is applied in the elongating direction.

If the weight of the aliphatic polyamide fiber is less than 10 with respect to the weight 100 of the aromatic polyamide fiber, when the above load is applied, since the cord extension becomes small, it becomes difficult to achieve the properties described above.

If the weight of the aliphatic polyamide fiber exceeds 170 with respect to the weight 100 of the aromatic polyamide fiber, when the above load is applied, since the cord extension becomes great, it becomes difficult to achieve the properties described above.

A preferable weight ratio of the aromatic polyamide fiber and the aliphatic polyamide fiber is from 100:17 to 100:86.

Examples of the aliphatic polyamide fiber are 6-nylon, 6,6-nylon, 4,6-nylon fiber and the like.

It is only necessary that the organic fiber cords comprise aromatic polyamide fiber and aliphatic polyamide fiber. The aromatic polyamide organic fiber cord and the aliphatic polyamide organic fiber cord may be laid together, or the aromatic polyamide fiber and the aliphatic polyamide fiber may be first combined and then laid.

When the aromatic polyamide organic fiber cord is defined as A and the aliphatic polyamide organic fiber cord is defined as B, if the A or B is inner-laid (Z layer) and then, they are neatly arranged and outer-laid (S layer) in the direction opposite to the inner-layer direction, thereby obtaining the organic fiber cord constituting the main belt layer.

When the inner-lay is carried out, A or B may be laid alone or A and B may be combined and then, they may be laid.

The number of A, B or AB (combined threads) at the time of inner-laying or outer-laying may be one or more.

Further, the thicknesses of A and B may be the same or different from each other.

As a type of combined threads, the threads may be wound around a core thread.

In one aspect of the invention, in the pneumatic radial tire, the main belt layer has a belt ply including an organic fiber cord which comprises an aromatic polyamide cord and an aliphatic polyamide cord which are laid together, and in which an inner-layer coefficient of the aromatic polyamide cord is 0.12 to 0.85.

Next, the effect of the pneumatic radial tire of this aspect will be described.

By setting the inner-layer coefficient of the aromatic polyamide cord to 0.12 to 0.85, it becomes easy to achieve the properties described above.

It is more preferable to set the inner-layer coefficient of the aromatic polyamide cord to 0.17 to 0.51.

In one aspect of the invention, in the pneumatic radial tire, the main belt layer has a belt ply including an organic fiber cord which is spirally wound at an angle of substantially 0° with respect to the tire equator surface.

Next, the effect of the pneumatic radial tire of this aspect will be described.

If the angle of the organic fiber cord with respect to the tire equator surface is set to substantially 0°, it is possible to utilize, to the utmost, the strength of the organic fiber cord used for securing the rigidity of the main belt layer in the circumferential direction, and the weight of the pneumatic radial tire can be reduced.

Here, the term "substantially 0°" includes 2.00 or less.

In one aspect of the invention, in the pneumatic radial tire the main belt layer has a belt ply including organic fiber cords which are inclined at an angle of 2 to 25° with respect to the tire equator surface and which are bent within the same plane such that the organic fiber cords are inclined in opposite directions from each other at each ply end and which extend in a circumferential direction of the tire in a zigzag form.

Next, the effect of the pneumatic radial tire of this aspect will be described.

If the main belt layer comprises a belt ply including organic fiber cords which are inclined at an angle of 2 to 25° with respect to the tire equator surface and which are bent within the same plane such that the organic fiber cords are inclined in opposite directions from each other at a ply end and which extend in a circumferential direction of the tire in a zigzag form, it is possible to secure the rigidity in the widthwise direction of the tire without largely deteriorating the rigidity of the main belt layer in the circumferential direction. As a result, it is possible to realize excellent wear resistance.

The reason why the excellent wear resistance is realized by securing the rigidity in the circumferential direction of the tire is as follows.

If a diameter difference between the crown center portion and the shoulder portion is great in the tire shape when the internal pressure is charged, a so-called "drag wear" is prone to be generated.

The center portion and the shoulder portion which come into contact with the ground during rotation of the tire are rotated by a length corresponding to the contact with the ground, but the tire rotation angle corresponding to the constant circumferential length of the shoulder portion having the smaller diameter is greater.

Thus, the shoulder portion is restrained rearward in the rotation direction until the shoulder portion separates away from the ground, and the center portion and the shoulder portion are sheared and deformed.

A phenomenon in which the shoulder portion relatively slips with respect to the road surface to correct this deformation is the "drag wear".

The magnitude of the deviation in position in the circumferential direction depends on the diameter difference between the center portion and the shoulder portion, and on the shear rigidity in the tread surface in the circumferential direction, and as the diameter difference is larger and the shear rigidity is smaller, the drag wear becomes greater.

Since the cord of the spiral belt is oriented in the substantial circumferential direction, the shear rigidity is small, and this is not effective for the drag wear.

To compensate this, if a belt having a cord which has a large angle with respect to the circumferential direction of the tire is added, the rigidity in the widthwise direction of the tire can be secured, and the wear characteristics can be enhanced.

If the angle of the organic fiber cord with respect to the tire equator surface becomes less than 2°, it becomes geometrically difficult to wind the belt in the zigzag form (i.e., it becomes a spiral-form).

On the other hand, if the angle of the organic fiber cord with respect to the tire equator surface exceeds 25°, the tension of the organic fiber cord exhibited in the circumferential direction of the tire becomes relatively small, and the efficiency of the pneumatic radial tire bearing the internal pressure is deteriorated.

In one aspect of the invention, in the pneumatic radial tire, an auxiliary belt is provided at an outer side of the main belt layer in the radial direction of the tire, and the auxiliary belt layer comprises a belt ply including an organic fiber cord whose elongation percentage when 2.1 cN/dtex load is applied is substantially equal to or greater than that of the organic fiber cord included in the belt ply of the main belt layer.

Next, the effect of the pneumatic radial tire of this aspect will be described.

Since the auxiliary belt layer includes the belt ply having the organic fiber cord whose elastic modulus is relatively small in which the elongation percentage when 2.1 cN/dtex load is applied is substantially equal to or higher than that of the organic fiber cord included in the belt ply of the main belt layer, even if damage caused by foreign matter reaches the auxiliary belt layer, the tension load ratio of the cord of the auxiliary belt layer is small as compared with the organic fiber cord of the main belt layer, the influence acting on the strength of the entire crown reinforcing layer is small. Further, since the stress concentration around the bottom portion of the cut is small, even if the aircraft keeps running, the possibility that the damage proceeds is small.

In one aspect of the invention, in the pneumatic radial tire, the auxiliary belt layer comprises the belt ply including the organic fiber cord whose angle with respect to the tire equator surface is substantially equal to or greater than that of the organic fiber cord included in the belt ply of the main belt layer.

Next, the effect of the pneumatic radial tire of this aspect will be described.

Since the auxiliary belt layer comprises the organic fiber cord of which an angle with respect to the tire equator surface is substantially equal to or greater than that of the organic fiber cord included in the belt ply of the main belt layer, even when the tire is cut by foreign matter and the damage reaches the belt layer, the crack does not proceed to the entire circumference in the circumferential direction, and it is possible to suppress the development of the crack at the belt end, and the safety of the tire is largely enhanced.

In one aspect of the invention, in the pneumatic radial tire, the auxiliary belt layer has a belt ply including an organic fiber cord which is inclined at an angle of 2 to 45° with respect to the tire equator surface.

Next, the effect of the pneumatic radial tire of this aspect will be described.

If the inclination angle of the organic fiber cord of the auxiliary belt layer with respect to the tire equator surface is lower than 2°, the rigidity of the auxiliary belt layer in the widthwise direction becomes smaller, and the drag wear at the shoulder portion is prone to be generated.

If the inclination angle of the organic fiber cord of the auxiliary belt layer with respect to the tire equator surface exceeds 45°, the rigidity of the belt ply in the circumferential direction is reduced, and it becomes necessary to increase the number of belt plies to suppress the diameter growth, and the weight of the tire is increased.

In one aspect of the invention, in the pneumatic radial tire, the auxiliary belt layer has a belt ply including organic fiber cords which are bent within the same plane such that the organic fiber cords are inclined in opposite directions from each other at each ply end and which extend in a circumferential direction of the tire in a zigzag form.

Next, the effect of the pneumatic radial tire of this aspect will be described.

The belt ply formed such that the organic fiber cords of the belt ply are inclined in the opposite directions at each ply end and bent in the same plane and extended in the zigzag form is structured so as not to have a cut end of the organic fiber cord at the ply end in the widthwise direction. Thus, it is possible to effectively prevent the ply end separation caused by the rigidity difference at the cord cut end from being generated.

In one aspect of the invention, in the pneumatic radial tire, the carcass layer includes at least two carcass plies formed of an organic fiber cord, which has a tensile fracture strength of 6.3 cN/dtex or higher, an elongation percentage of 0.2 to 1.8% when 0.2 cN/dtex load is applied in an elongating direction, an elongation percentage of 1.4 to 6.4% when 1.9 cN/dtex load is applied in the elongating direction, and an elongation percentage of 2.1 to 8.6% when 2.9 cN/dtex load is applied in the elongating direction.

Next, the effect of the pneumatic radial tire of this aspect will be described.

As an example of the pneumatic radial tire of the invention, if a cord having high elastic modulus is used for the belt layer and a cord having low elasticity such as nylon is used for the carcass layer, when the standard internal pressure is charged, the growth in the radial direction is suppressed by the high elastic cord, and since the tire relatively freely swells in the widthwise direction of the tire, the falling-down of the bead portion becomes greater as compared with a conventional tire.

This is not a serious problem in a normal using state of a tire, but under an extremely severe condition that the tire rotates at high speed with excessive load, inconvenience such as separation in the bead portion may generate in some cases.

To solve such a problem, the pneumatic radial tire of this aspect includes at least two carcass plies made of high elastic organic fiber cord, and the organic fiber cord has a tensile fracture strength of 6.3 cN/dtex or higher. With this structure, there are effects such that the number of carcass plies is reduced and the tire weight is reduced.

Here, it is preferable that the organic fiber cord has elongation percentage of 0.2 to 1.8% when 0.2 cN/dtex load is applied in an elongating direction, elongation percentage of 1.4 to 6.4% when 1.9 cN/dtex load is applied in the elongating direction, and elongation percentage of 2.1 to 8.6% when 2.9 cN/dtex load is applied in the elongating direction.

This is because that if the elongation percentage of the organic fiber cord exceeds the above range, the effect for effectively suppressing the swelling of the carcass layer in the widthwise direction is small, and if the elongation percentage of the organic fiber cord is lower than the above range, since the cord rigidity is high, when the number of plies is large, a circumference difference is generated between the outer layer ply and the inner layer ply, and this cause large disturbance in the ply when molding a tire.

It is more preferable that the organic fiber cord has elongation percentage of 0.2 to 1.4 when 0.2 cN/dtex load is applied in an elongating direction, elongation percentage of 2.5 to 5.9% when 1.9 cN/dtex load is applied in the elongating direction, and elongation percentage of 4.0 to 8.0% when 2.9 cN/dtex load is applied in the elongating direction.

In one aspect of the invention, in the pneumatic radial tire, the carcass layer has a carcass ply including an organic fiber which is formed of aromatic polyamide fiber, and which has an inner-layer coefficient of 0.12 to 0.85, and more preferably 0.17 to 0.51, and an outer-layer coefficient of 0.4 to 0.85.

Next, the effect of the pneumatic radial tire of this aspect will be described.

By forming the organic fiber cord, which forms the carcass layer, from aromatic polyamide fiber, and making the inner-layer coefficient 0.12 to 0.85, and more preferably 0.17 to 0.51, and the outer-layer coefficient 0.40 to 0.85, it is possible to set the organic fiber cord to the properties described above.

In one aspect of the invention, in the pneumatic radial tire, the carcass layer has a carcass ply including an organic fiber cord which includes aromatic polyamide fiber and aliphatic polyamide fiber, and a weight ratio of the aromatic polyamide fiber and the aliphatic polyamide fiber is from 100:12 to 100:510, and more preferably from 100:27 to 100:255.

Next, the effect of the pneumatic radial tire of this aspect will be described.

If the carcass layer includes a carcass ply having organic fiber cords, and the organic fiber cords have aromatic polyamide fiber and aliphatic polyamide fiber, and a weight ratio of the aromatic polyamide fiber and the aliphatic polyamide fiber is from 100:12 to 100:510, and more preferably from 100:27 to 100:255, it is possible to set the organic fiber cord to the properties described above. That is, it is possible to set the organic fiber cord to have the tensile fracture strength of 6.3 cN/dtex or higher, an elongation percentage of 0.2 to 1.8% when 0.2 cN/dtex load is applied in an elongating direction, an elongation percentage of 1.4 to 6.4% when 1.9 cN/dtex load is applied in the elongating direction, and an elongation percentage of 2.1 to 8.6% when 2.9 cN/dtex load is applied in the elongating direction.

If the weight of the aliphatic polyamide fiber is less than 12 with respect to the weight 100 of the aromatic polyamide fiber, when the above load is applied, since the cord extension becomes small, it becomes difficult to achieve the properties defined above.

If the weight of the aliphatic polyamide fiber exceeds 510 with respect to the weight 100 of the aromatic polyamide fiber, when the above load is applied, since the cord extension becomes great, it becomes difficult to achieve the properties defined above.

Examples of the aliphatic polyamide fiber are 6-nylon, 6,6-nylon, 4,6-nylon fiber and the like.

The organic fiber cords may be formed from aromatic polyamide fiber and aliphatic polyamide fiber. The aromatic polyamide organic fiber cord and the aliphatic polyamide organic fiber cord may be laid together, or the aromatic polyamide fiber and the aliphatic polyamide fiber may be combined and then laid.

When the aromatic polyamide organic fiber cord is defined as A and the aliphatic polyamide organic fiber cord is defined as B, if the A or B is inner-laid (Z layer) and then, they are neatly arranged and outer-laid (S layer) in the direction opposite to the inner-layer direction, thereby obtaining the organic fiber cord constituting the main belt layer.

When the inner-lay is carried out, A or B may be laid alone or A and B may be combined and then, they may be laid.

The number of A, B or AB (combined threads) at the time of inner-laying or outer-laying may be one or more.

Further, the thicknesses of A and B may be the same or different from each other.

As a type of combined threads, the threads may be wound around a core thread.

In one aspect of the invention, in the pneumatic radial tire, the carcass layer has a carcass ply including an organic fiber cord which comprises aromatic polyamide organic fiber cord and aliphatic polyamide organic fiber cord which are laid together, and in which an inner-layer coefficient of the aromatic polyamide organic fiber cord is 0.12 to 0.85, and more preferably 0.17 to 0.51.

Next, the effect of the pneumatic radial tire of this aspect will be described.

By setting the inner-layer coefficient of the aromatic polyamide cord to 0.12 to 0.85, more preferably 0.17 to 0.51, it becomes easy to achieve the properties described above.

In one aspect of the invention according, in the pneumatic radial tire, a protective belt layer is disposed at an outer side of the auxiliary belt layer in the radial direction of the tire via a rubber layer which is 1.5 to 4.5 mm thick, and the protective belt layer includes a non-metallic waved cord wavily extending in the circumferential direction of the tire and having a tensile strength of 1000 MPa or higher.

Next, the effect of the pneumatic radial tire of this aspect will be described.

By disposing the protective belt layer, which a non-metallic waved cord extending in the circumferential direction of the tire in a waved form and having a tensile strength of 1000 MPa or higher, at an outer side of the auxiliary belt layer in the radial direction of the tire via a rubber layer of 1.5 to 4.5 mm thick, regarding the sticking of foreign matter or the like into the tread, tension is eased with deformation in a direction where the waved shape of the non-metallic cord disappears, and by enveloping the foreign matter, the foreign matter is prevented from entering the main belt layer.

In the case of the aircraft pneumatic radial tire, if the wearing lifetime of the tread is elapsed, the worn tread is removed and a new tread is attached, this is so-called remoulding. At this time, the outermost protective belt layer is removed together with the worn tread.

Thus, if the thickness of the rubber layer becomes less than 1.5 mm, when the tire is remoulded, it becomes difficult to remove the protective layer without damaging the main and auxiliary belt layers existing at the inner side in the radial direction.

On the other hand, if the thickness of the rubber layer exceeds 4.5 mm, not only the tire weight increases, but also the tread heat increase, which is disadvantageous for the endurance.

In one aspect of the invention, in the pneumatic radial tire, the waved cord has an amplitude of 5 to 25 mm and a wavelength of 200 to 700% of the amplitude in a state in which an internal pressure is not charged.

Next, the effect of the pneumatic radial tire of this aspect will be described.

If the amplitude of the waved cord is less than 5 mm and the wavelength of the waved cord exceeds 700% of the amplitude, the waved cord will be almost fully stretched in the circumferential direction, when inner pressure is charged into the pneumatic radial tire and when load is applied thereto, the enveloping effect when foreign matter enters becomes small.

On the other hand, if the amplitude of the waved cord exceeds 25 mm and the wavelength of the waved cord is less than 200% of the amplitude, it becomes difficult to secure a sufficient gap between the cords adjacent to each other, and sufficient rubber layer can not be secured between the cords. Thus, since the adjacent cords come into contact with each other, the possibility that separation generates between the cord and the rubber becomes high.

Therefore, it is preferable to set the waved cord to have an amplitude of 5 to 25 mm and a wavelength of 200 to 700% of the amplitude.

In one aspect of the invention according to claim 23, in the pneumatic radial tire of any one of claims 1 through 22, in a state in which a standard internal pressure defined in TRA is charged, a growth rate of a tire outer diameter is 0.3 to 5.5% as compared with a state before the internal pressure is charged.

Next, the effect of the pneumatic radial tire of this aspect will be described.

If the growth rate of the tire outer diameter is less than 0.3%, it becomes difficult to select a tire material under a high internal pressure of an aircraft tire.

On the other hand, if the growth rate of the tire outer diameter exceeds 5.5%, the elongation in the circumferential direction of the tread becomes great when the tire is used, and the resistance against the invasion of foreign matter becomes small.

An aspect of invention provides a pneumatic radial tire comprising: a carcass layer formed of one or more carcass plies formed of an organic fiber cord extending substantially in a radial direction of the tire; and a belt layer which includes a plurality of belt plies and is disposed between a crown region of the carcass layer and a tread, wherein a total thickness of the belt layer at a central option in the widthwise direction thereof is thicker than the thickness of a side portion in the widthwise direction thereof, and the belt layer includes an auxiliary belt layer located at an outer side in the radial direction, and a main belt layer located at an inner side in the radial direction, the auxiliary belt layer is formed of a plurality of belt plies whose width is gradually reduced towards the outerside in he radial direction, and a maximum width of the auxiliary belt layer is in a range of 60 to 90% of a tire maximum width, the main belt layer is formed of a plurality of belt plies whose width is gradually reduced towards the innerside in the radial direction, and a maximum width of the main belt layer is in a range of 15 to 60% of the tire maximum width, and each of the belt plies of the main belt layer comprises cords which intersect with a tire equator surface at an angle of 2° to 25° and which are bent within the same plane such that the cords are inclined in opposite directions from each other at each ply end and which extend in a circumferential direction of the tire in a zigzag form, or cords which extend spirally at substantially 0° with respect to the tire equator surface.

Next, the effect of the pneumatic radial tire of this aspect will be described.

In this pneumatic radial tire, when the tread swells and deforms by the charge of the internal pressure, a tread central region in which the swelling amount is the largest in the conventional tire is reinforced by the multi-layered belt plies and the swelling deformation is advantageously restrained, and the tread swells substantially uniformly over the entire width due to selected widths of the belt plies. Therefore, the ground contact pressure of the ground-contacting surface of the tread can sufficiently be uniform.

Therefore, early wear caused by increase of the ground-contact pressure and deviated wear caused by the drag of the tread side region are effectively prevented, and the tread endurance can be enhanced, and, especially in the tread central region, the expansion amount of the tread rubber in the circumferential direction is suppressed, and the degree of the tension can be reduced. Therefore, the enveloping properties of the tread can be enhanced, and foreign matter can be prevented from sticking.

Further, the belt ply of the main belt layer is formed by a cord extending in the circumferential direction in a zigzag form or a cord spirally extending in the circumferential direction, and the cord cut end is removed from the side edge of the belt ply. Thus, even if force is applied to the tread in the widthwise direction thereof, the stress in the side edge of the belt ply can be effectively dispersed, and the separation of the belt ply is effectively prevented, thereby enhancing the belt endurance.

Moreover, by setting the maximum width of the main belt layer to 15 to 60% of the tire maximum width, the weight is effectively prevented from being increased, and swelling deformation of the tread central region can be effectively restrained. Further, forming the main belt layer by the belt plies whose width is gradually reduced towards the inward radial direction, abrupt variation in belt rigidity can be avoided.

Note that it is preferable to set the number of belt plies of the main belt layer to about 2 to 6, in order to both suppress the weight and to restrain the swelling deformation in a higher order.

In one aspect of the invention, in the pneumatic radial tire, elastic moduli of cords constituting the belt plies of the main belt layer and the auxiliary belt layer are in a range of 100 to 700% of that of the organic fiber cord of the carcass ply.

Next, the effect of the pneumatic radial tire of this aspect will be described.

Here, the term "elastic modulus" is an tensile elastic modulus per unit block of a rubber-fiber compound. A sample was made by cutting off excessive upper and lower rubbers by a slicer such that the vulcanized rubber-fiber compound cord will not be damaged (in a case of a carcass ply, the carcass ply in the vicinity of he tire maximum width, along the ply cord around the vicinity of the maximum width, an unit block i.e., a rubber compound block of one fiber was cut out as a sample having a length of 100 mm). Then, an initial load corresponding to 50 g/mm (e.g., if the unit block width is 2 mm, the load is 100 g) was applied to the sample at a testing temperature of 25° C. by a tensile testing machine such as instron, autograph or the like, and a constant speed tensile test was carried out at a tensile speed of 50 mm/minute, a load-elongation curve was formed, and then, the same test as JIS L1017-1983 was carried out, and the elastic modulus was calculated according to the following equation.

$$E = (P \times 1)/(1' \times S)$$

wherein,

P: 2.1 cN/dtex load (N)

S: sample cross sectional area per unit block (mm$^2$)

1: initial length of test piece (mm)

1': length TH (mm) when a point is defined as A on the load-elongation curve at which 2.1 cN/dtex load is applied, a value obtained by subtracting a normal line from the point A with respect to the abscissa axis is defined as H, and an intersection point of a tangent in the point A and the abscissa axis is defined as T.

According to this, a hoop effect which is necessary for the belt ply can be exhibited, and extreme rigidity difference between the tread and the tire side portion can be sufficiently removed.

That is, if the elastic modulus of the cord of the belt ply of the main belt layer and the auxiliary belt layer is less than 100% of the elastic modulus of the organic fiber cord of the carcass ply, the diameter growth suppressing function when the internal pressure is charged into the tire can not be sufficiently exhibited, and since it will be necessary to increase the number of belt plies to suppress the diameter growth, the weight of the tire increases.

On the other hand, if the elastic modulus of the cord of the belt ply of the main belt layer and the auxiliary belt layer exceeds 700% of the elastic modulus of the organic fiber cord of the carcass ply, since the hoop effect of the belt layer becomes excessively great, in the cross section of the tire width, the rigidity difference between the maximum width position of the belt layer and the tire side portion becomes great, the tire side portion abnormally swells outward in the widthwise direction by, for example, the charged internal pressure, and the balance of the entire tire will be lost.

In one aspect of the invention, in the pneumatic radial tire, the cord constituting the belt ply of the main belt layer is an aromatic polyamide organic fiber cord.

Next, the effect of the pneumatic radial tire of this aspect will be described.

When the cord constituting the belt ply of the main belt layer is an aromatic polyamide organic fiber cord, since the organic fiber cord has elastic modulus of about 2 to 5 times of that of an aliphatic polyamide cord which is usually used for the belt layer, the swelling of the tread central region caused by the internal pressure can be effectively suppressed, and the same effect can be obtained with smaller number of belt plies, it is advantageous to reduce the tire weight.

In one aspect of the invention, in the pneumatic radial tire, a protective belt layer is disposed between the auxiliary belt layer and the tread, the protective belt layer being formed of a non-metallic cord which extends in a circumferential direction in a zigzag form having an amplitude of 5 to 25 mm and a wavelength of 200 to 700% of the amplitude, and has a tensile strength of 1000 MPa or higher.

Next, the effect of the pneumatic radial tire of this aspect will be described.

Note that, the tensile strength was measured by obtaining the tensile elongation (%) and strength (MPa) in accordance with JIS L1017-1982 at a testing temperature of 25° C. using an autograph produced by Kabushiki Kaisha Shimazu Seisakusho.

This protective belt layer eases the tension with deformation of a non-metallic cord in a direction in which the zigzag waveform disappears against the sticking of foreign matter or the like, and functions to prevent the invasion of the foreign matter into the belt layer by enveloping the foreign matter.

Here, the reason why the non-metallic cord is set to have an amplitude of 5 to 25 mm and a wavelength of 200 to 700% of the amplitude is that if the amplitude is less than 5 mm and the wavelength exceeds 700%, the waved cord will be almost fully stretched in the circumferential direction, when inner pressure is charged into the pneumatic radial tire and when load is applied thereto, the enveloping effect when foreign matter enters becomes small. Further, if the amplitude exceeds 25 mm and when the wavelength is less than 200%, it becomes difficult to secure a sufficient gap between the adjacent cords, and sufficient rubber layer can not be secured between the cords, the adhering portion between the rubber layer and the tread rubber is reduced, the adhering strength between the protective belt layer and the tread rubber is lowered and the separation is prone to be generated.

The reason why the tensile strength is set to 1000 MPa or higher is that, in general, the incision resistance of the cord is higher as the tensile strength is greater, and since the aromatic polyamide cord has relatively high tensile strength among the known organic fibers (1000 MPa or higher), it is efficient to employ this.

In one aspect of the invention, in the pneumatic radial tire, one of circumferential grooves formed along the tread extends from a tread central portion.

Next, the effect of the pneumatic radial tire of this aspect will be described.

When one of circumferential grooves formed in the tread extends in a tread central portion, it becomes easy to avoid the disposition of the circumferential groove in the vicinity of the side edge of the main belt layer which generates the rigidity difference in the widthwise direction of the tread, and it is possible to prevent the generation of the groove bottom crack without deteriorating the drainage performance of the tire.

An one aspect of invention of provides a method of producing a pneumatic radial tire, in which a green tire is molded on a split-type rigid core having an outer surface shape corresponding to an inner surface shape of a product tire, the green tire is mounted in a mold together with the rigid core, and subjected to vulcanization.

According to the method of producing the pneumatic radial tire, since the product tire can be obtained without deforming the tire or the components thereof from the start of molding of the green tire to the completion of the vulcanization, the size precision of each portion of the tire can be largely enhanced.

In one aspect of the invention, in a method of producing a pneumatic radial tire, wherein a main belt layer is molded in an annular recess provided in a widthwise-direction central portion of a belt-molding drum.

The main belt layer which projects radially inwardly of the tire can be molded using a usual cylindrical belt-molding drum.

If the belt diameter is largely different between the green tire at the time of molding and the product tire, there is a high possibility that a high elastic belt ply cord such as aromatic polyamide fiber is displaced in the widthwise direction by the pressure at the time of vulcanization, and the tire performance may be deteriorated. Therefore, in order to suppress the diameter variation as small as possible from the green tire at the time of molding to the product tire, it is preferable that the main belt layer is molded in the annular recess.

BRIEF DESCRIPTION OF THE DRAWINGS

FIG. 1 is a sectional view of a pneumatic radial tire according to a first embodiment.

FIG. 5 is a plan view of an endless zigzag-wound belt.

FIG. 14 is a graph showing a relation between elongation and strength of organic fiber cords of a carcass layer.

FIG. 20 shows a belt structure of a comparative example tire.

BEST MODES FOR CARRYING OUT THE INVENTION

First Embodiment

One example of a mode for carrying out the present invention will be described with reference to the drawings below.

A pneumatic radial tire of a first embodiment of the present invention will be described with reference to FIGS. 1 to 5.

Figure 2A:
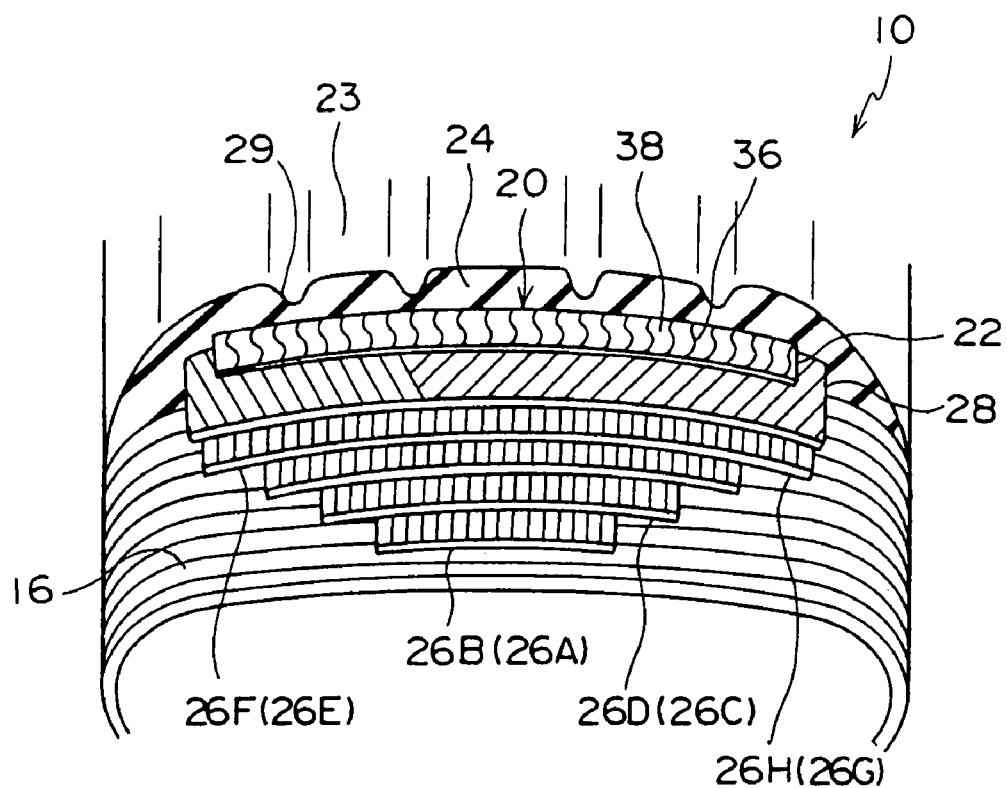
FIG. 2A is an exploded perspective view of the pneumatic radial tire shown in FIG. 1.

As shown in FIGS. 1 and 2A, an aircraft pneumatic radial tire 10 (tire size: 1270×455R22 32PR) of the present embodiment has a bead portion 12 which includes bead cores 14 having a circular cross section. A carcass layer 16 including six carcass plies (not shown) in which rubber-coated organic fiber cords are arranged in a radial direction is retained to the bead cores 14.

Note that, since other structure members such as flipper and chafer are the same as the conventional members, they are not illustrated in the drawings.

A belt layer 20 is provided on an outer peripheral surface of a crown region located on an outer side of the carcass layer 16 in the radial direction of the tire. A tread rubber layer 24 constituting a tread portion 23 is provided on an outer side of the belt layer 20 in the radial direction of the tire.

A side rubber layer 27 constituting a sidewall portion 25 is provided on an outer side of the carcass layer in the widthwise direction of the tire.

In the present embodiment, the belt layer 20 is formed by a main belt layer 26 disposed on an inner side in the radial direction of the tire, an auxiliary belt layer 28 provided on the outer side in the radial direction of the tire, and a protective belt layer 22 provided on the outer side of the auxiliary belt layer 28 in the radial direction of the tire.

(Carcass Layer)

It is preferable that the organic fiber cord used for the carcass ply constituting the carcass layer 16 has a tensile fracture strength of 6.3 cN/dtex or higher, an elongation percentage of 0.2 to 1.8% when a load is 0.2 cN/dtex in the elongating direction, an elongation percentage of 1.4 to 6.4% when a load is 1.0 cN/dtex in the elongating direction, and an elongation percentage of 2.1 to 8.6% when a load is 2.9 cN/dtex in the elongating direction (see FIG. 14).

Organic fiber cords made of aromatic polyamide fiber can be used as the carcass layer 16. In this case, in the organic fiber cord, it is preferable that an inner-layer coefficient is 0.12 to 0.85, more preferably 0.17 to 0.51, and that an outer-layer coefficient is 0.4 to 0.85.

Further, an organic fiber cord (so-called a hybrid cord) including aromatic polyamide fiber and aliphatic polyamide fiber can be used in the carcass layer 16. In this case, in the organic fiber cord, it is preferable that a weight ratio of the aromatic polyamide fiber and the aliphatic polyamide fiber is from 100:27 to 100:255.

Moreover, in the carcass layer 16, an organic fiber cord (so-called a hybrid cord) in which aromatic polyamide organic fiber cord and aliphatic polyamide organic fiber cord are laid, and an inner-layer coefficient N1 of the polyamide organic fiber cord is 0.12 to 0.85, more preferably 0.17 to 0.51, can be utilized.

In the present embodiment, a nylon cord is used for the carcass layer 16.

(Main Belt Layer)

Figure 3:
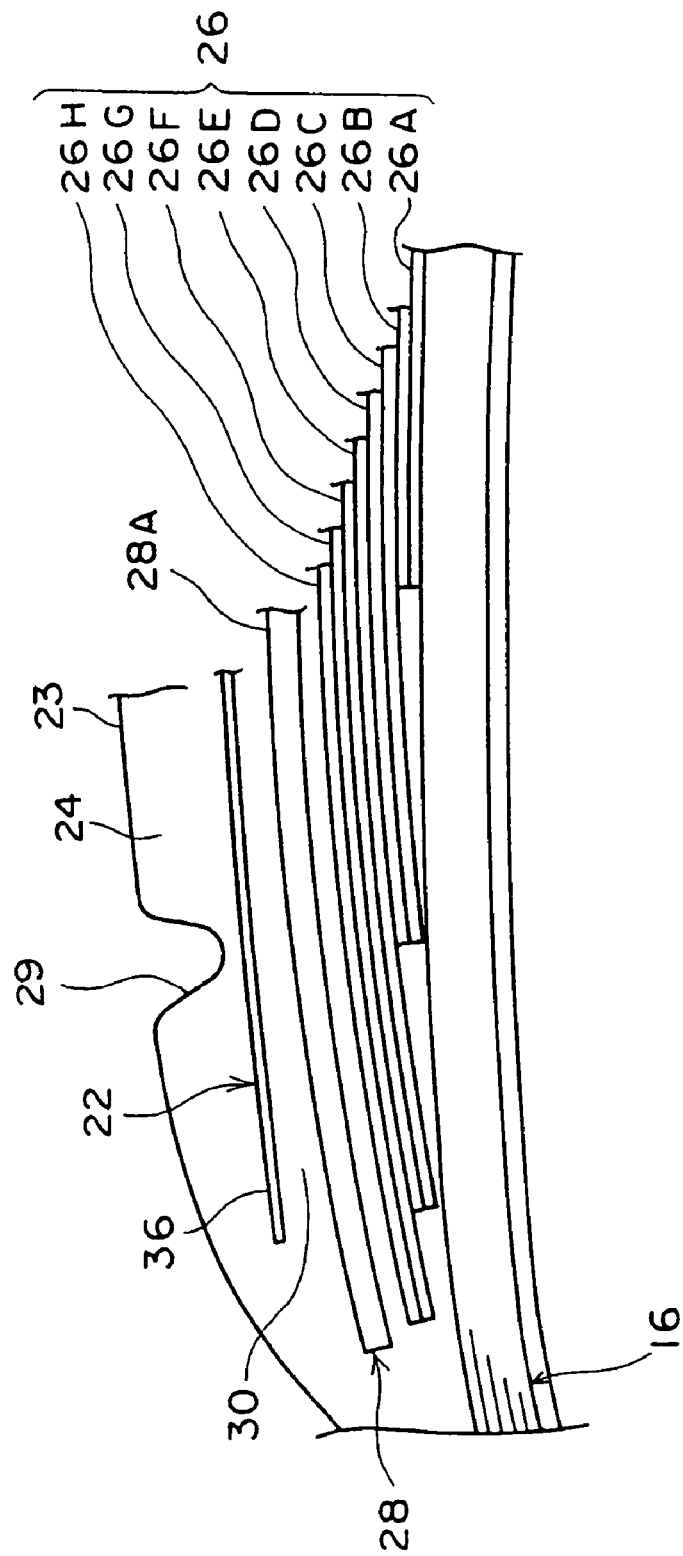
FIG. 3 is an enlarged sectional view of a tread of the pneumatic radial tire shown in FIG. 1.

As shown in FIG. 3, the main belt layer 26 is formed of a plurality of belt plies. In the present embodiment, there are eight belt plies which are, from the inner side in the radial direction of the tire, first belt ply 26A, second belt ply 26B, third belt ply 26C, fourth belt ply 26D, fifth belt ply 26E, sixth belt ply 26F, seventh belt ply 26G, and eighth belt ply 26H.

In the present embodiment, widths of the first belt ply 26A and the second belt ply 26B are the same, widths of the third belt ply 26C and fourth belt ply 26D are the same, widths of the fifth belt ply 26E and the sixth belt ply 26F are the same, and widths of the seventh belt ply 26G and the eighth belt ply 26H are the same.

The widths of the third belt ply 26C and the fourth belt ply 26D are wider than those of the first belt ply 26A and the second belt ply 26B. The widths of the fifth belt ply 26E and the sixth belt ply 26F are wider than those of the third belt ply 26C and fourth belt ply 26D. The widths of the seventh belt ply 26G and the eighth belt ply 26H are wider than those of the fifth belt ply 26E and the sixth belt ply 26F.

Therefore, the two belt plies, i.e., the seventh belt ply 26G and the eighth belt ply 26H are laminated on the end portion of the main belt layer 26 in the widthwise direction of the tire.

The first belt ply 26A to eighth belt ply 26H constituting the main belt layer 26 are formed by coating a plurality of organic fiber cords with rubber.

Figure 13:
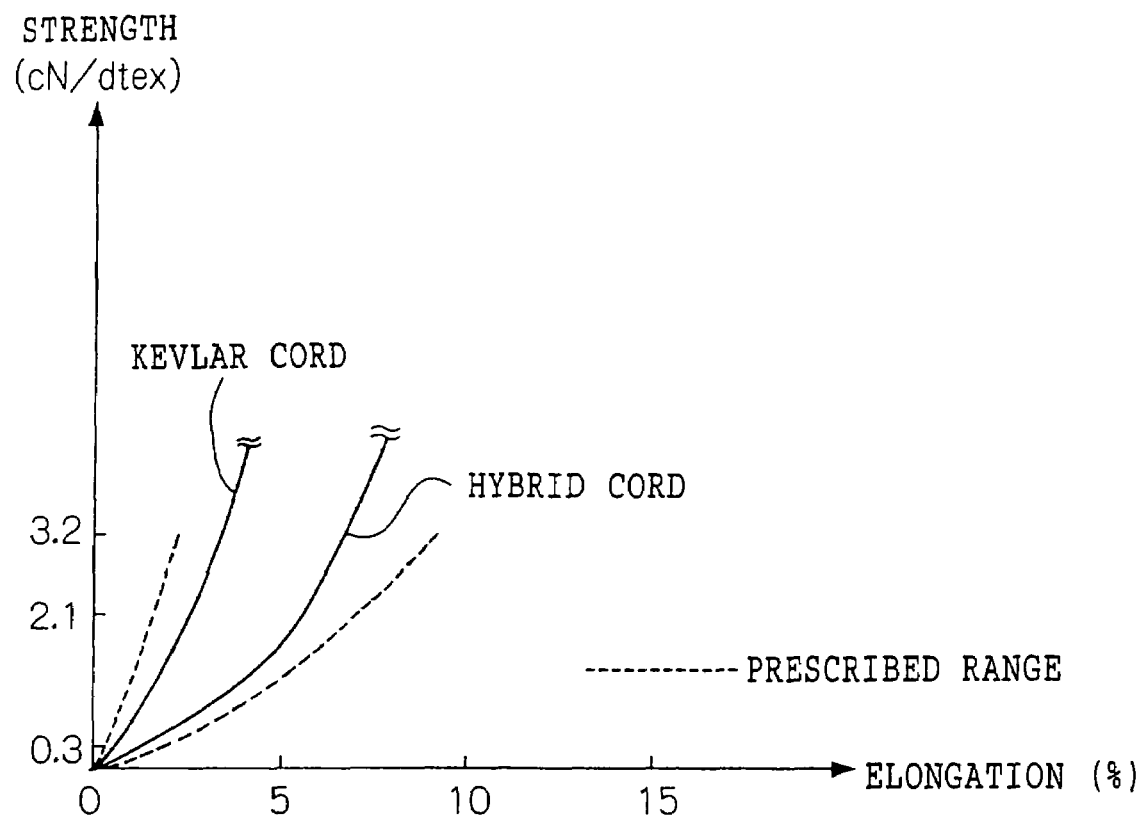
FIG. 13 is a graph showing a relation between elongation and strength of organic fiber cords of a main belt layer.

It is preferable that the tensile fracture strength of each of the organic fiber cords of the first belt ply 26A to the eighth belt ply 26H is 6.3 cN/dtex or higher, the elongation percentage when 0.3 cN/dtex load is applied in the elongating direction is 0.2 to 2.0%, the elongation percentage when 2.1 cN/dtex load is applied in the elongation direction is 1.5 to 7.0%, and the elongation percentage when 3.2 cN/dtex load is applied in the elongating direction is 2.2 to 9.3% (see FIG. 13).

The organic fiber cord of the present embodiment comprises aromatic polyamide fiber.

When the organic fiber cord is formed from aromatic polyamide fiber, it is preferable that the inner-layer coefficient is 0.12 to 0.85, more preferably 0.17 to 0.51, and the outer-layer coefficient is 0.40 to 0.80.

In the present embodiment, organic fiber cords comprising aromatic polyamide fiber, more specifically, polyamide fiber produced by E.I.Du Pont de Nemours & Co. (trade name: KEVLAR(R)29, nominal denier is 3000 denier, this fiber is called Kevlar, hereinafter) is used in the first belt ply 26A through the eighth belt ply 26H.

A method of producing the aromatic polyamide organic fiber cord will be described hereinafter.

Three Kevlars (3000 denier=3340 dtex) were subjected to a inner-laying process using a laying machine such that the inner-layer coefficient becomes 0.34.

Then, a cord-laying process was carried out by neatly aligning the three inner-laid threads and performing outer-laying (S layer) in a direction opposite from the inner-layer such that the outer-layer coefficient becomes 0.48.

The laid cord was subjected to a dip processing using a cord processing machine produced by Kabushiki Kaisha Ichikin Kogyo, and the cord was produced.

Tensile fracture strength of the dip cord was measured at 25 ±2° C. room temperature using an autograph produced by Kabushiki Kaisha Shimazu Seisakusho, and the value was 14 cN/dtex.

At this time, when the elongation percentage of the dip cord was measured at the time when the stress acting on the dip cord in the tension direction pointed 0.3 cN/dtex, 2.1 cN/dtex and 3.2 cN/dtex, the elongation percentage was 0.3%, 2.2% and 3.2%, respectively.

Note that the strength of the organic fiber cord (Kevlar) used for the first belt ply 26A to the eighth belt ply 26G was 1400 N.

In the present embodiment, the first belt ply 26A to eighth belt ply 26H constituting the main belt layer 26 are so-called spiral belts which are formed in such a manner that a plurality of organic fiber cords are coated with rubber to form band-like thin bodies 32, and the thin bodies 32 are spirally wound such that no gap is generated.

In the present embodiment, the inclination angle of the organic fiber cord is substantially 0° with respect to the tire equator surface CL.

In the first belt ply 26A to the eighth belt ply 26H, the number of drivings of the organic fiber cord is preferably in a range of 4 to 10 cords/10 mm.

In the present embodiment, in the first belt ply 26A to the eighth belt ply 26H, the number of drivings of the organic fiber cord is 6.3 cords/10 mm.

(Auxiliary Belt Layer)

When the auxiliary belt layer 28 is provided as in the present embodiment, it is preferable that the auxiliary belt layer 28 is provided in a range from the tire equator surface CL and a 140% position of the width BW of the main belt layer 26.

In the present embodiment, the width SBW of the auxiliary belt layer 28 is 103% of the width BW of the main belt layer 26.

The auxiliary belt layer 28 is formed of one belt ply 28A in the present embodiment.

As shown in FIG. 5, the belt ply 28A of the present embodiment is formed in such a manner that one or more organic fiber cords are coated with rubber to form band-like thin bodies 34, and the thin bodies 34 are wound such that whenever the thin bodies 34 are wound once, the thin bodies 34 reciprocate between both ends of the plies and the thin bodies 34 are inclined at an angle of 2 to 25° with respect to the tire equator surface, and this winding is carried out many times while offsetting the thin bodies 34 as substantially the same distance as their widths in the circumferential direction such that no gap is generated between the thin bodies 34 (this is called endless zigzag-wound belt, hereinafter).

As a result, the organic fiber cord which extends in substantially the circumferential direction in a zigzag manner is embedded in the entire region of the belt ply 28A substantially uniformly by changing the bending direction at the both ply ends in the belt ply 28A.

In a cross section of the belt ply 28A which is formed in the above-described manner, right upward diagonal organic fiber cords and left upward diagonal cords are superposed on one another. Therefore, this structure corresponds to a so-called intersection belt structure in which a belt ply only comprising the right upward diagonal cords and a belt ply only comprising the left upward diagonal cords are superposed on each other. Thus, although there is actually one ply, in the present embodiment, the number of the plies is counted as two.

In the belt ply 28A, it is preferable to use organic fiber cords having an elastic modulus which is equal to or smaller than that of the organic fiber cords included in the main belt layer 26 (having an elongation percentage is substantially equal to or greater than that of the organic fiber cords of the main belt layer 26 when 2.1 cN/dtex load is applied).

Preferable examples of organic fiber cords used for the belt ply 28A which constitutes the auxiliary belt layer 28 are cords made of aliphatic polyamide fiber such as nylon, and cords including aromatic polyamide fiber such as aramid and aliphatic polyamide fiber such as nylon. In the present embodiment, nylon cords (the number of lays: 1260D//2/3, and the number of drivings: 7.3 cords/10 mm) are used.

In the belt ply 28A of the present embodiment which is an endless zigzag-wound belt, the inclination angle of the organic fiber cord is preferably in a range of 2 to 45° with respect to the tire equator surface CL, and in the present embodiment, the angle is set to 8°.

(Protective Layer)

As shown in FIG. 2A, the protective belt layer 22 is provided on an outer side of the auxiliary belt layer 28 in the radial direction of the tire via a rubber layer 30.

The thickness of the rubber layer 30 is preferably in a range of 1.5 to 4.5 mm, and in the present embodiment, it is set to 2.5 mm.

As shown in FIG. 2A, the protective belt layer 22 comprises one waved cord ply 38 in which a plurality of organic fiber cords 36 extending in the circumferential direction of the tire in a waved form are arranged in parallel to each other and are coated with rubber (rubber is not illustrated in the drawing).

Figure 2B:
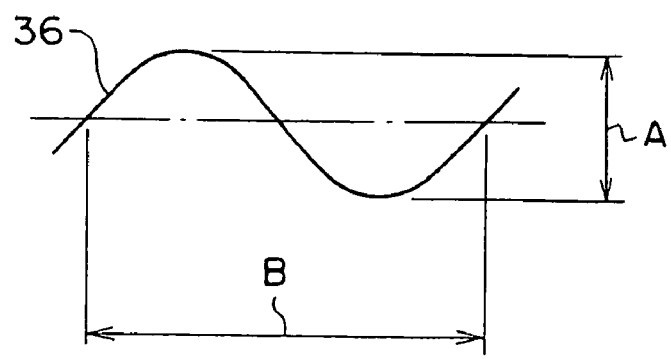
FIG. 2B is a plan view of a cord of a protective layer.

As shown in FIG. 2B, it is preferable that the amplitude A of the organic fiber cords 36 of the protective belt layer 22 is set to 5 to 25 mm, and the wavelength B thereof is set to 200 to 700% of the amplitude A.

It is preferable that the organic fiber cords 36 have high strength and high cut-resistance, and the cords being disposed as tight as possible while securing adhesion.

In the present embodiment, Kevlar (3000D/3, the number of drivings: 3.6 cords/10 mm) is used in the organic fiber cords 36 of the protective belt layer 22.

(Total Strength)

Next, when a total strength of the belt layer 20 (main belt layer 26 +auxiliary belt layer 28+protective belt layer 22) in the circumferential direction of the tire per unit width at a position P0 of the tire equator surface CL is defined as K0 and a total strength of the belt layer 20 per unit of width at a width position corresponding to ⅔ of the maximum width (SBW; the auxiliary belt layer 28 is widest in the present embodiment) of the belt layer 20 having the tire equator surface CL as a center is defined as K2, it is necessary to satisfy K2<K0, and it is preferable that $0.3 \leqq K2/K0 \leqq 0.8$ is satisfied.

A method of calculating the total strength of the present embodiment will be described hereinafter.

When the belt layer 20 is formed from Kevlar cords and nylon cords as in the present embodiment, in the calculation method of elongation which provides strength, in this case, 10% of the elongation when one Kevlar cord breaks is given as the cord elongation (when the belt layer 20 comprises plural types of cords, the calculation is carried out based on the smallest elongation among the elongation of the cords when breakage).

The strength of each cord when it is elongated 10%, Kevlar cord is 1400 N, and nylon cord is 205 N.

In the main belt layer 26, the number of cord drivings per 10 mm of width is 6.3, in the auxiliary belt layer 28, the number of cord drivings per 10 mm of width is 7.3, and in the protective belt layer 22, the number of cord drivings per 10 mm of width is 3.6.

In the present embodiment, nine Kevlar cords (eight main belt layers+one protective belt layer) are laminated, and two nylon cords (two auxiliary belt layers) are laminated at the position P0 of the tire equator surface CL.

At the width position P2 corresponding to ⅔ of the maximum width SBW of the belt layer 20, five Kevlar cords (four main belt layers+one protective belt layer) are laminated and two nylon cords (two auxiliary belt layers) are laminated.

The cord strength when the waved organic fiber cord of the protective belt layer 22 is elongated by 10% is 80 N, the number of cords per 10 mm of width is 3.6, and one cord layer is constituted at the position P0 of the tire equator surface CL and the width position P2 corresponding to ⅔ of the maximum width SBW of the belt layer 20 around the tire equator surface CL.

Note that, when the organic fiber cord has a waved shape as in the present embodiment, the strength is not calculated by stretching the organic fiber cord straightly, but is calculated when the organic fiber cord is embedded within he tire, i.e., calculating the strength when the waved organic fiber cord is elongated by 10%.

Further, when the organic fiber cord is inclined at an angle θ with respect to the circumferential direction of the tire, the strength in the circumferential direction of the cord is calculated by multiplying the cord strength by cosθ.

Here, since the angle θ of the nylon cord of the auxiliary belt layer with respect to the circumferential direction of the tire is 8°, the strength in the circumferential direction of the cord is calculated by multiplying cos8°=0.99 to the cord strength of nylon.

The total strength K0 of the belt layer 20 at the position P0 is 73811 N (1400 (N)×6.3 (cords)×8 (the number of laminated layers)+205 (N)×7.3 (cords)×2 (the number of laminated layers)×0.99+80 (N)×3.6 (cords)×1 (the number of laminated layers)).

The total strength K2 of the belt layer 20 at the position P2 is 38531 N (1400 (N)×6.3 (cords)×4 (the number of laminated layers)+205 (N)×7.3 (cords)×2 (the number of laminated layers)×0.99+80 (N)×3.6 (cords)×1 (the number of laminated layers).

That is, K2/K0 is 0.52 in the present embodiment.

In the belt layer 20, when the laminated layer thickness of the organic fiber cord is made to be thickest at the tire equator surface position P0, and when the laminated layer thickness of the organic fiber cord at the tire equator surface position P0 is defined as G0, and the laminated layer thickness of the organic fiber cord at the width position P2 corresponding to ⅔ of the maximum width SBW of the belt layer 20 is defined as G2, it is preferable that G2<G0 is satisfied, and it is further preferable that 0.35≦G2/G0≦0.85 is satisfied.

In the present embodiment, G2/G0 is set to 0.63.

A plurality of circumferential grooves 29 are formed in the tread portion 23.

(Effect)

In the pneumatic radial tire 10 of the present embodiment, since the strength of the belt layer 20 at the tire equator surface position P0 is set to be greater than the strength of the belt layer 20 at the width position P2 corresponding to ⅔ of the maximum width SBW, it is possible to obtain the pressure tightness which endures four times greater internal pressure as compared with a standard tire, and to satisfy the endurance at the time of high speed running, and to reduce the weight of the tire.

By securing sufficiently great rigidity for the belt of the tire center where the elongation percentage of the outer diameter is the greatest, it is possible to suppress the elongation amount of the tread rubber layer 24 and reducing the tension of the tread rubber layer 24, to increase the resistance against the sticking of foreign matter, and to enhance the safety of the tire.

Further, it is possible to obtain uniform growth in the tread central region to the shoulder region when the internal pressure is charged, and the deviated wear can be suppressed.

If the strength ratio K2/K0 of the belt layer 20 becomes lower than 0.2, there is an adverse possibility that an excessive tension is applied to the organic fiber cord located in the vicinity of the shoulder portion of the belt layer 20 thereby lowering the pressure tightness performance.

On the other hand, if the strength ratio K2/K0 of the belt layer 20 exceeds 0.8, the organic fiber cord disposed at the width position P2 corresponding to ⅔ of the maximum width SBW of the belt layer 20 will not be effectively utilized, and will lead to increment of weight of the pneumatic radial tire 10.

In the present embodiment, in the belt layer 20, since the laminated layer thickness G2 of the organic fiber cord at the width position P2 corresponding to ⅔ of the maximum width SBW is set greater than the laminated layer thickness G0 of the organic fiber cord at the tire equator surface position P0, the K2<K0 can be easily achieved.

In the belt layer 20, if the ratio G2/G0 of the laminated layer thickness of the organic fiber cord becomes lower than 0.35, there is an adverse possibility that an excessive tension is applied to the organic fiber cord located in the vicinity of the shoulder portion, thereby lowering the pressure tightness performance.

On the other hand, if the ratio G2/G0 of the laminated layer thickness of the organic fiber cord in the belt layer 20 exceeds 0.85, the organic fiber cord disposed at the width position P2 corresponding to ⅔ of the maximum width SBW of the belt layer 20 will not be effectively utilized, and will lead to increment of weight of the pneumatic radial tire 10.

In the present embodiment, since the tensile fracture strength of the organic fiber cord constituting the first belt ply 26A to the eighth belt ply 26H of the main belt layer 26 is set to 6.3 cN/dtex or higher, necessary pressure tightness could be satisfied and the weight of the tire could be reduced.

Further, in the organic fiber cords constituting the first belt ply 26A to the eighth belt ply 26H of the main belt layer 26, the elongation percentage when 0.3 cN/dtex load is applied in the elongating direction is 0.2 to 2.0%, the elongation percentage when 2.1 cN/dtex load is applied in the elongation percentage is 1.5 to 7.0%, and the elongation percentage when 3.2 cN/dtex load is applied in the elongating direction is 2.2 to 9.3%. Therefore, it is possible to easily suppress the target diameter growth. With this, it is possible to secure the resistance against the sticking of foreign matter and to optimize the hoop effect by the main belt layer 26.

If the elongation percentage of the organic fiber cords constituting the first belt ply 26A to the eighth belt ply 26H of the main belt layer 26 exceeds the above range, the swell of the tire in its radial direction can not be effectively suppressed, and the resistance against the sticking of foreign matter can not be expected.

On the other hand, if the elongation percentage of the organic fiber cords constituting the first belt ply 26A to the eighth belt ply 26H of the main belt layer 26 is lower than the above range, since the hoop effect of each belt ply is excessively great, and as a result, the carcass layer 16 swells in the widthwise direction of the tire more than necessary which is not preferable.

In the embodiment, since the elongation percentage of the organic fiber cords constituting the first belt ply 26A to the eighth belt ply 26H of the main belt layer 26 when 0.3 cN/dtex load is applied is set to 0.2 to 2.0%, the pneumatic radial tire 10 can be expanded uniformly by pressure applied from the green tire at the time of vulcanization and with this, the directions of the organic fiber cords can be uniformed and variations of the cord drivings can be corrected.

If the elongation percentage of the organic fiber cords constituting the first belt ply 26A to the eighth belt ply 26H of the main belt layer 26 when 0.3 cN/dtex load is applied is greater than 2.0%, the cord properties correcting effect at the time of vulcanization is deteriorated which is not preferable.

If the elongation percentage of the organic fiber cords constituting the first belt ply 26A to the eighth belt ply 26H of the main belt layer 26 when 0.3 cN/dtex load is applied is smaller than 0.2%, the cord tension becomes great when the tire is expanded at the time of vulcanization, and a possibility such as the organic fiber cord bite into the radially inner rubber of the tire may occur that this is not preferable.

In the present embodiment, in the end portion of the main belt layer 26 in the widthwise direction of the tire, since the two belt plies, i.e., the seventh belt ply 26G and the eighth belt ply 26H are laminated, even under a condition in which strong tension variation is caused in the organic fiber cord in the vicinity of opposite ends of the tire in the ground-contacting surface in the widthwise direction as in a case in which external force is applied in the widthwise direction of the tire during the running, the impact can be effectively dispersed while its elasticity, and the reliability of the pneumatic radial tire 10 under a severe using condition is enhanced.

Since the organic fiber cords of the first belt ply 26A to the eighth belt ply 26H constituting the main belt layer 26 are made of aromatic polyamide fiber, and the inner-layer coefficient is set within a range of 0.12 to 0.85, and the outer-layer coefficient is set within a range of 0.40 to 0.80, it is able to set the tensile fracture strength of the organic fiber cord to 6.3 cN/dtex or higher, and to set the elongation percentage when 0.3 cN/dtex load is applied in the elongating direction to 0.2 to 2.0%, the elongation percentage when 2.1 cN/dtex load was applied in the elongating direction to 1.5 to 7.0%, and the elongation percentage when 3.2 cN/dtex load is applied in the elongating direction to 2.2 to 9.3%.

In the present embodiment, the first belt ply 26A to the eighth belt ply 26H constituting the main belt layer 26 are spiral belts, and the angle of the organic fiber cord with respect to the tire equator surface CL is set to substantially 0°. Therefore, the strength of the organic fiber cord used for securing the rigidity of the main belt layer 26 in the circumferential direction can be utilized to the utmost, and the quantity consumed of the organic fiber cord can be minimized, and thus, the weight of the pneumatic radial tire 10 can be reduced.

The auxiliary belt layer 28 comprising the belt ply 28A including the organic fiber cord in which an angle thereof with respect to the tire equator surface CL is set greater than that of the organic fiber cord included in the first belt ply 26A to the eighth belt ply 26H is provided on the outer side of the main belt layer 26 in the radial direction of the tire, and the width SBW of the auxiliary belt layer 28 is set to 103% of the width BW of the main belt layer 26.

Further, in the present embodiment, the organic fiber cord of the auxiliary belt layer 28 has lower elasticity than that of the organic fiber cord of the main belt layer 26. Thus, the tension load is smaller than that of the organic fiber cord of the main belt layer 26, and even when the tire runs on foreign matter on a running road and the organic fiber cord of the auxiliary belt layer 28 is damaged, the influence acting on the strength of the entire crown reinforcing layer is small. Moreover, since the stress concentration around the lowest bottom portion of the cut is small, even if the aircraft keeps running, the possibility that the damage proceeds is small.

In the present embodiment, since the organic fiber cord of the auxiliary belt layer 28 is inclined at an angle of 2 to 45° with respect to the tire equator surface CL, even if the belt ply 28A of the auxiliary belt layer 28 is cut and the crack expand, the crack reaches the belt end portion along the cord, and further expansion of the crack can be prevented.

Note that, if the inclination angle of the organic fiber cord of the auxiliary belt layer 28 with respect to the tire equator surface CL is lower than 2°, when the tire is cut and the crack expand, the preventing effect of the crack expansion in the circumferential direction of the tire is deteriorated. Since the rigidity of the tire in the widthwise direction thereof can not be secured, drag wear is prone to be generated.

If the inclination angle of the organic fiber cord of the auxiliary belt layer 28 with respect to the tire equator surface CL exceeds 45°, the rigidity of the belt ply in the circumferential direction is deteriorated, and since it is necessary to increase the number of belt plies to suppress the diameter growth, the weight of the tire will increased.

The belt ply 28A of the auxiliary belt layer 28 which is bent within the same plane such that the organic fiber cords are inclined in the opposite directions at the ply ends and which are extended in a zigzag manner in the circumferential direction of the tire does not have a cut end of the organic fiber cord in the ply end in the widthwise direction. Therefore, even when a load is applied to the tire in the widthwise direction and a large distortion is generated in the ply end, the auxiliary belt layer 28 is less prone to be separated (between the cord cut end and the cover rubber).

In the present invention, the protective belt layer 22 including the organic fiber cords 36 extending in a waved form in the circumferential direction of the tire is disposed on the outer side of the auxiliary belt layer 28 in the radial direction of the tire via a 2.5 mm thick rubber layer 30. Therefore, tension is moderated with deformation in a direction in which the wave shape of the organic fiber cords 36 disappears against the sticking of foreign matter into the tread rubber layer 24, and envelopes foreign matter, thereby preventing the foreign matter from entering into the main belt layer 26.

If the thickness of the rubber layer 30 is less than 1.5 mm, when remoulding the tire, it becomes difficult to remove the rubber layer 30 without damaging the main belt layer 26 existing at the inner side of the tire in the radial direction.

On the other hand, if the thickness of the rubber layer 30 exceeds 4.5 mm, not only the weight of the tire increase, but also heat generation of the tread increase, which is disadvantageous for the endurance of the tire.

When the amplitude A of the organic fiber cords 36 of the protective belt layer 22 is less than 5 mm and the wavelength B exceeds 700% of the amplitude A, the organic fiber cords 36 are substantially stretched in the circumferential direction due to charging of the internal pressure into the pneumatic radial tire 10 and a load applied thereto. Thus, the enveloping effect when foreign matter enters will become small.

On the other hand, when the amplitude A of the organic fiber cords 36 exceeds 25 mm and the wavelength B is less than 200% of the amplitude A, it becomes difficult to secure a sufficient gap between the adjacent organic fiber cords 36, and sufficient rubber layer (rubber for coating the organic fiber cords 36) can not be secured between the cords. Therefore, the contact portion between the rubber layer of the protective belt layer 22 and the tread rubber layer 24 is reduced, and the adhesion strength between the organic fiber cords 36 and the tread rubber layer 24 is lowered, thereby separation is prone to be generated.

Note that, since the protective belt layer 22 including the organic fiber cords 36 is provided on the outermost layer in the present embodiment, even if the tread rubber layer 24 is worn and the protective belt layer 22 appears from the tread surface, spark will not occur as when a metal cord is utilized.

Second Embodiment

A pneumatic radial tire 40 of a second embodiment of the invention will be described with reference to FIG. 6. The components same as those of the first embodiment are designated with the same symbols, and explanation thereof is omitted.

Figure 6A:
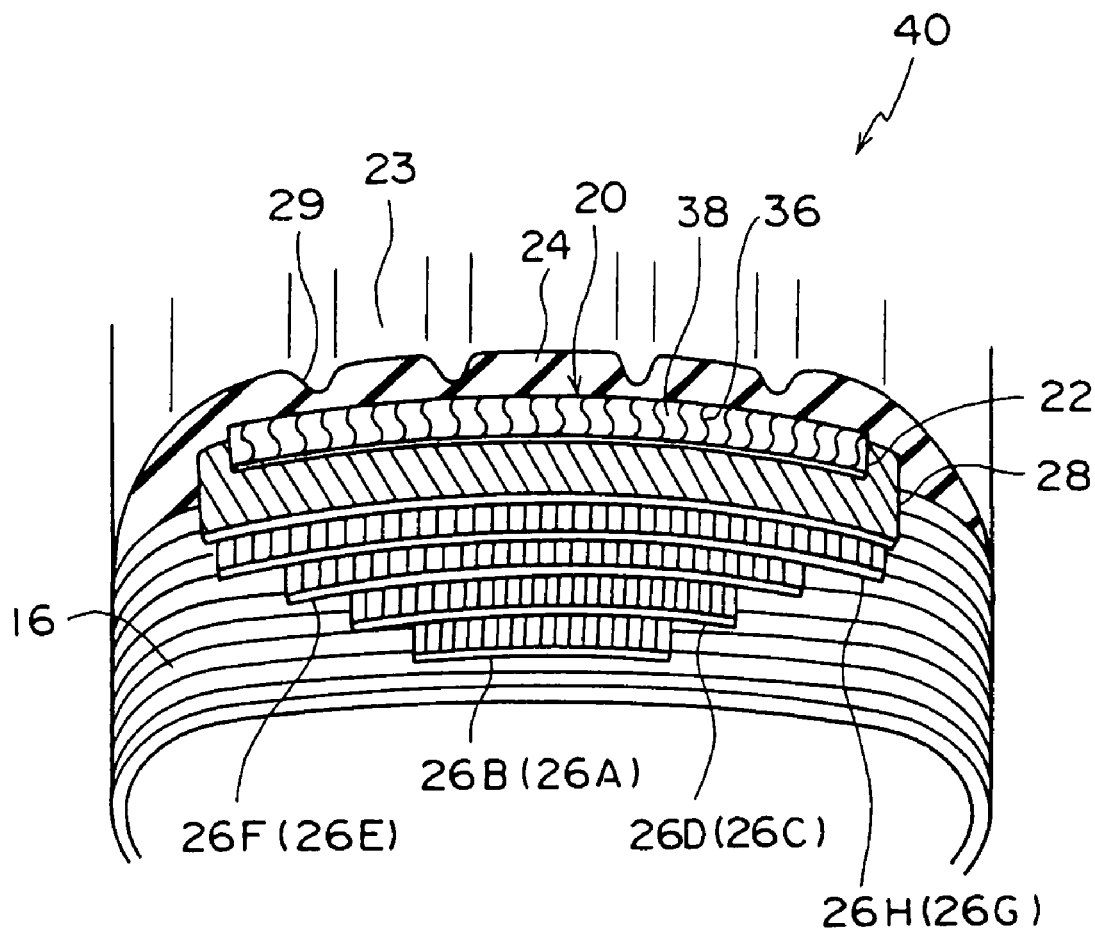
FIG. 6A is an exploded perspective view of a pneumatic radial tire according to a second embodiment.

As shown FIG. 6A, in the pneumatic radial tire 40 of the embodiment, the auxiliary belt layer 28 is a so-called intersection belt layer and other structure of the pneumatic radial tire 40 is the same as that of the pneumatic radial tire 10 of the first embodiment.

Figure 6B:
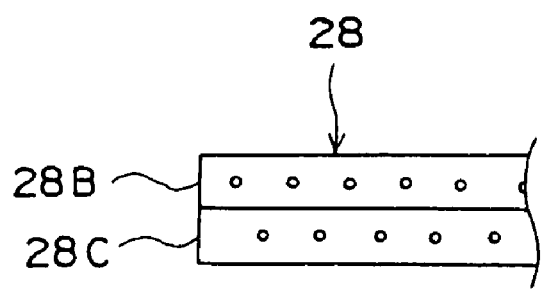
FIG. 6B is a sectional view of an auxiliary belt layer.

As shown in FIG. 6B, the auxiliary belt layer 28 is formed from two belt plies, belt ply 28 B and belt ply 28 C. For example, the belt ply 28B includes a plurality of organic fiber cords diagonally inclined left upwardly with respect to the tire equator surface CL, and the belt ply 28C includes a plurality of organic fiber cords diagonally inclined right upwardly with respect to the tire equator surface CL.

The organic fiber cords used for the belt ply 28B and the belt ply 28C are so-called hybrid cords including aromatic polyamide fibers and aliphatic polyamide fibers.

Preferable characteristics and a producing method of the hybrid cord will be described in a description of a next third embodiment.

Although the auxiliary belt layer 28 of the embodiment is the intersection belt layer, the same effect as that of the pneumatic radial tire 10 of the first embodiment can be obtained.

In the case of the endless zigzag-wound belt, due to the producing method, the angle of the cord with respect to the tire equator surface CL is relatively small in general, and the angles of the cords are varied depending upon the number of reciprocating motions of the cords in the widthwise direction of the tire per one round of the tire in many cases (e.g., 8°, 16° and the like).

On the other hand, the angle of the cord of the intersection belt layer can freely be set. Further, when an intersection belt is applied, generally, the angle of the cord becomes slightly larger (about 1° to 30°).

In the intersection belt layer, when the angle of the cord is large, since the rigidity of the tire in the widthwise direction can be secured, this is effective for the drag wear of the shoulder portion.

Third Embodiment

Next, a pneumatic radial tire 42 of a third embodiment of the invention will be described with reference to FIG. 7. The components same as those of the first embodiment are designated with the same symbols, and explanation thereof is omitted.

Figure 7:
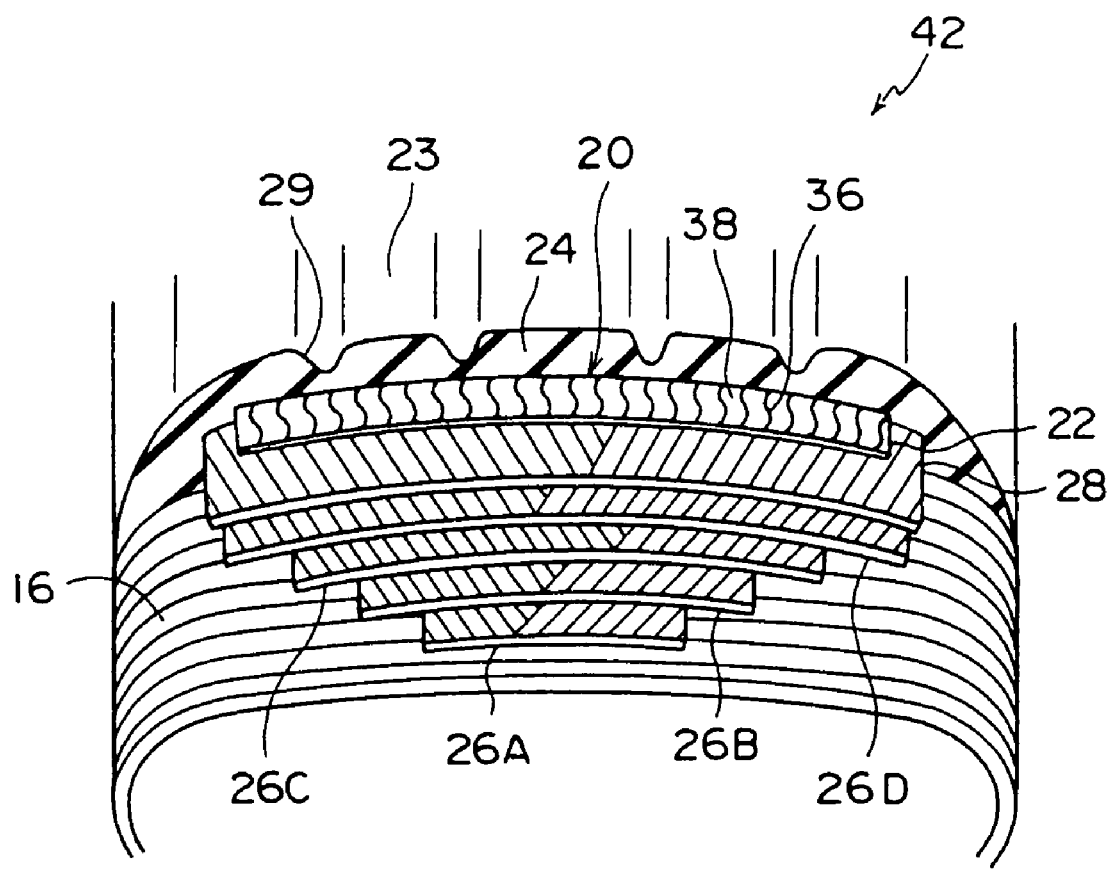
FIG. 7 is an exploded perspective view of a pneumatic radial tire according to a third embodiment.

As shown in FIG. 7, in the pneumatic radial tire 42 of the present embodiment, only the ply structure of the main belt layer 26 and the material of the organic fiber cord are changed, and other structure of the pneumatic radial tire 40 is the same as that of the pneumatic radial tire 10 of the first embodiment.

The main belt layer 26 of the embodiment is formed of four belt plies, i.e., a first belt ply 26A to a fourth belt ply 26D which are endless zigzag-wound belts having the same structure as that of the belt ply 28A of the auxiliary belt layer 28 used in the first embodiment (the number of plies of the main belt layer 26 is counted as eight).

The angle of the organic fiber cord in each of the first belt ply 26A to the fourth belt ply 26D with respect to the tire equator surface CL is set to 2 to 8°.

The organic fiber cords used for the first belt ply 26A to the fourth belt ply 26D of the embodiment are so-called hybrid cords including aromatic polyamide fibers and aliphatic polyamide fibers.

The weight ratio between the aromatic polyamide fiber and the aliphatic polyamide fiber is preferably from 100:10 to 100:170, and more preferably from 100:17 to 100:86.

With this, the tensile fracture strength can be set to 6.3 cN/dtex or higher, the elongation percentage when 0.3 cN/dtex load is applied in the elongating direction can be set to 0.2 to 2.0%, the elongation percentage when 2.1 cN/dtex load is applied in the elongating direction can be set to 1.5% or higher and 7.0% or lower, and elongation percentage when 3.2 cN/dtex load is applied in the elongating direction can be set to 2.2% or higher and 9.3% or lower.

Note that when the aromatic polyamide organic fiber cord and the aliphatic polyamide organic fiber cord is laid together, it is preferable that the inner-layer coefficient of the aromatic polyamide organic fiber cord is 0.12 to 0.85.

Next, a method of producing the organic fiber cord used for the first belt ply 26A to the fourth belt ply 26D of the embodiment will be described.

Two Kevlar (3000 denier=3340 dtex) and two 66-nylons (1260 denier=1400 dtex) are combined to form one thread, and the thread is subjected to inner-lay process using a laying machine so that the inner-layer coefficient of Kevlar becomes 0.34, and the inner-layer coefficient of nylon 66 becomes 0.18.

Then, the two Kevlar inner-laid threads and one 66-nylon inner-laid thread are neatly arranged, and are outer-laid in a direction opposite the inner-layer to form a laid cord.

The laid cord is subjected to a dip processing using a cord processing machine produced by Kabushiki Kaisha Ichikin Kogyo, to produced the cord.

A tensile fracture strength of the dip cord was measured using an autograph produced by Kabushiki Kaisha Shimazu Seisakusho in a room temperature of 25±2° C., and the value was 11 cN/dtex.

The elongation percentage of the dip cord was measured when stresses in the tension direction of the dip cord were 0.3 cN/dtex, 2.1 cN/dtex and 3.2 cN/dtex. The elongation percentage pointed 11%, 5.6% and 6.6%, respectively.

Note that, the fracture strength of the organic fiber cord was 1100 N.

Although the ply structure of the main belt layer 26 and the material of the organic fiber cord of the present embodiment are different from those of the pneumatic radial tire 10 of the first embodiment, the same effect as that of the pneumatic radial tire 10 of the first embodiment can be obtained.

Further, since the rigidity of the tire in the widthwise direction can be secured, this is effective for the drag wear of the shoulder portion.

Fourth Embodiment

Next, a pneumatic radial tire 44 of a fourth embodiment of the invention will be described with reference to FIG. 8. The components same as those of the first embodiment are designated with the same symbols, and explanation thereof is omitted.

Figure 8:
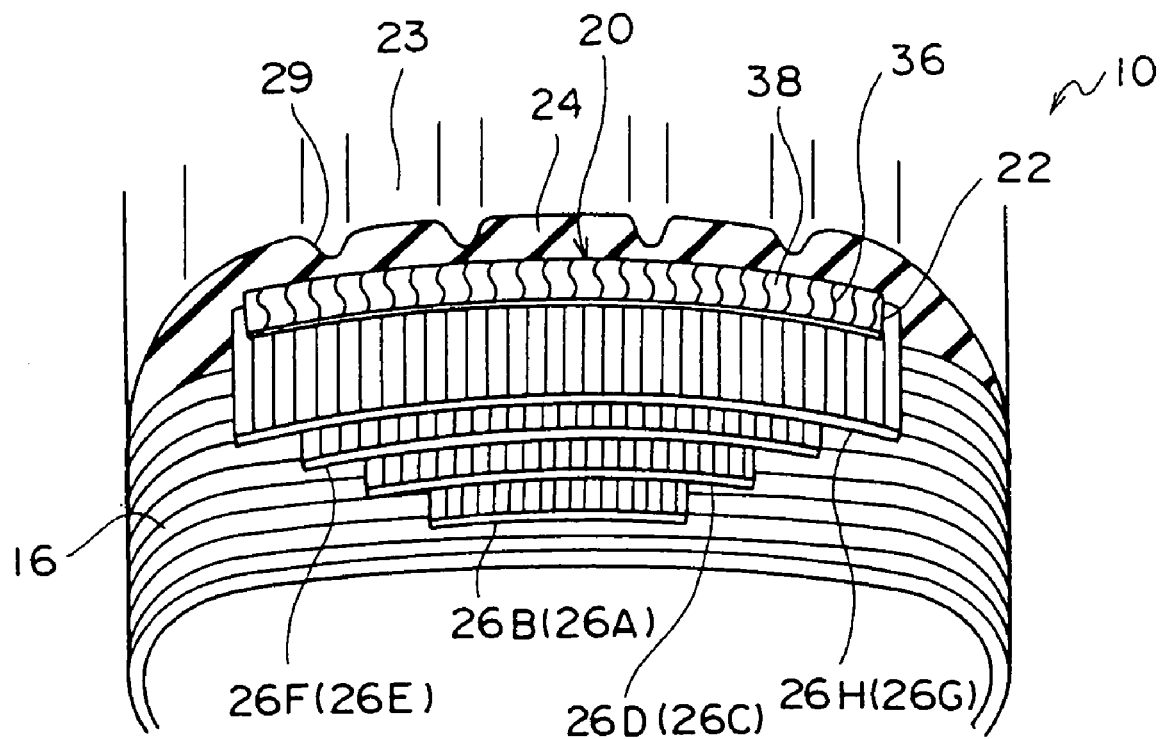
FIG. 8 is an exploded perspective view of a pneumatic radial tire according to a fourth embodiment.

As shown in FIG. 8, the pneumatic radial tire 44 of the present embodiment corresponds to a structure of the pneumatic radial tire 10 of the first embodiment from which the auxiliary belt layer 28 is removed.

In the case of the pneumatic radial tire 44 of the present embodiment, although the crack expansion when the belt is damaged and wear resistance are slightly inferior, cut resistance is sufficiently higher than that of the conventional tire, and lightening effect of the tire is large.

Fifth Embodiment

Next, a pneumatic radial tire 46 of a fifth embodiment of the invention will be described with reference to FIG. 9. The components same as those of the first embodiment are designated with the same symbols, and explanation thereof is omitted.

Figure 9:
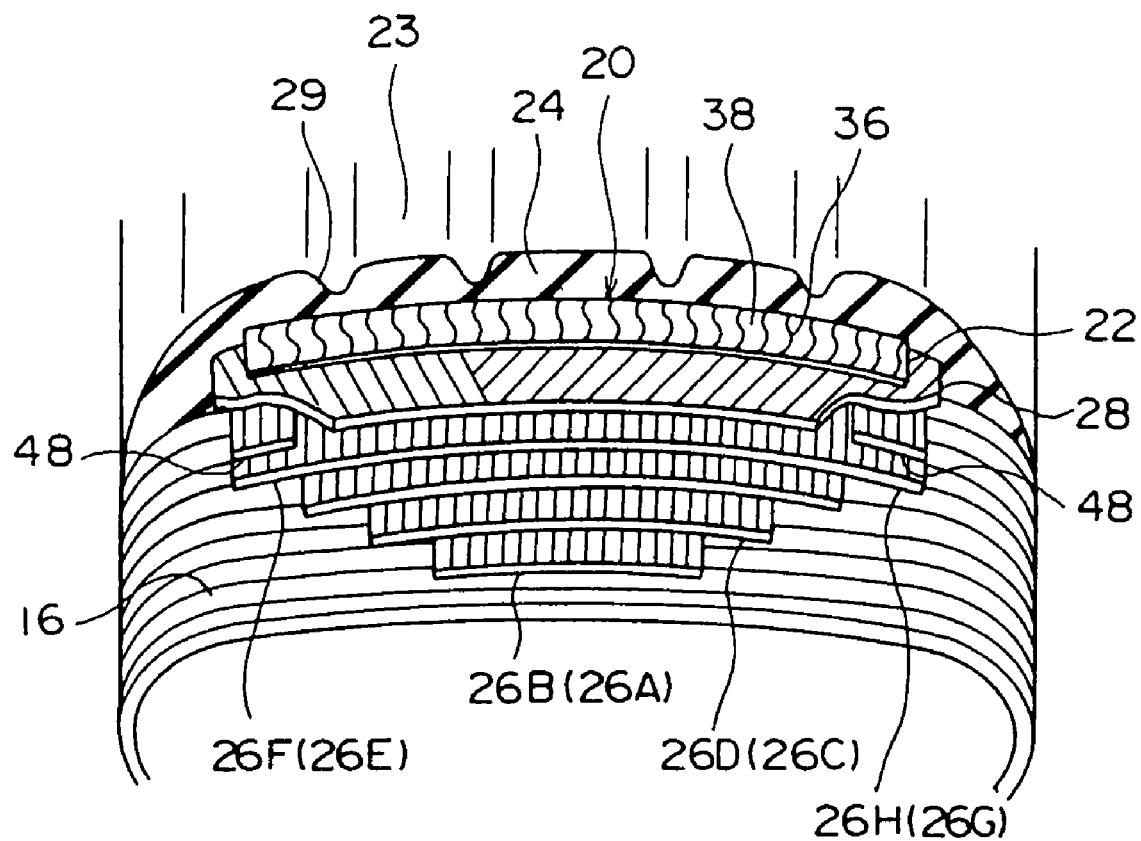
FIG. 9 is an exploded perspective view of a pneumatic radial tire according to a fifth embodiment.

As shown in FIG. 9, a pneumatic radial tire 46 of the embodiment is structured basically the same as that of the pneumatic radial tire 10 of the first embodiment. However, two belt plies 48 having narrow widths are superposed at the outer side in the vicinity of the opposite ends of the main belt layer 26 of the radial direction of the tire.

The belt plies 48 have the same structures (spiral belts) as those of the first belt ply 26A to the eighth belt ply 26H, and merely the width of the belt plies 48 is narrow.

The two belt plies 48 have the same widths, and are provided from slightly outer side from the width position P2 corresponding to ⅔ of the maximum width of the belt layer 20 to the end of the belt layer 20.

If the belt plies 48 are provided in this manner and the laminated layer thickness of the organic fiber cords are made thick in a region on the outer side of the tire in the widthwise direction from the width position P2 corresponding to ⅔ of the maximum width SBW of the belt layer 20, when the tire is exposed to external force in the widthwise direction of the tire at the time of high speed traveling, the large tension variation of the opposite sides of the tire can be absorbed, and it is possible to effectively prevent the generation of a standing wave which largely reduces the lifetime of the pneumatic radial tire.

Sixth Embodiment

Next, a pneumatic radial tire 50 of a sixth embodiment of the invention will be described with reference to FIG. 10. The present embodiment is a modified example of the third embodiment, and thus, the components same as those of the third embodiment are designated with the same symbols, and explanation thereof is omitted.

Figure 10:
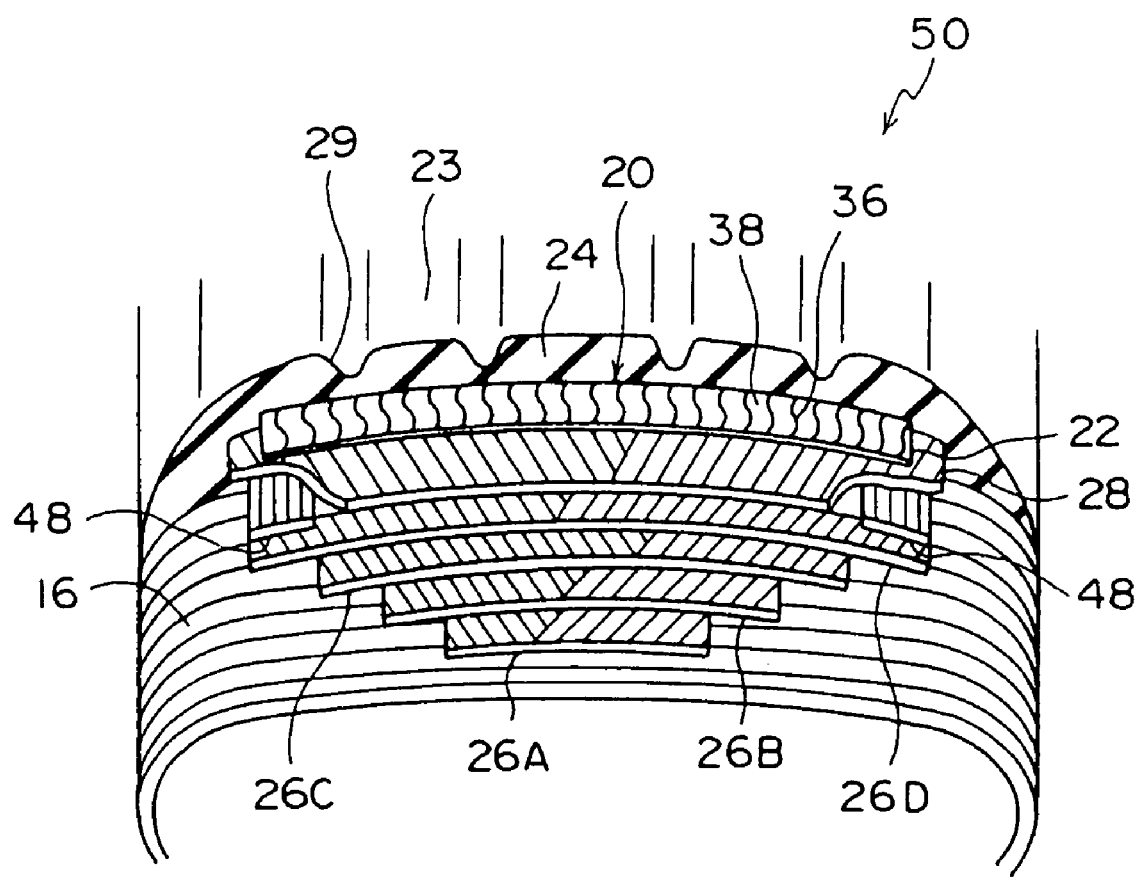
FIG. 10 is an exploded perspective view of a pneumatic radial tire according to a sixth embodiment.

As shown in FIG. 10, the pneumatic radial tire 50 of the present embodiment is a tire provided with two superposed narrow belt plies 48 as same as the fifth embodiment at the outer side in the radial direction of the tire in the vicinity of the opposite ends of the main belt layer 26, in the pneumatic radial tire 46 of the third embodiment.

In the pneumatic radial tire 50 of the present embodiment, the same effect as that of the pneumatic radial tire 46 of the fifth embodiment can also be obtained.

Test Example 1

Next, in order to make sure the effect of the invention, one type of a conventional pneumatic radial tire, four types of comparative example pneumatic radial tires, and 13 types of pneumatic radial tires to which the embodiments of the present invention was applied were prepared, and the weight, the diameter growth rate, cut resistance and pressure tightness of each tire were checked. The size of each tire is 1270×455R22 32PR.

A test method will be described hereinafter.

Tire weight: the tire weight is expressed using indices in which the conventional tire is set to 100. As the numerical value is smaller, the weight is lighter.

Tire diameter growth rate: an outer diameter increasing rate of a tire center portion was checked before and after the air pressure was charged. As the increasing rate is smaller, the tension of the tread rubber layer is smaller.

The air pressure of MEASURING RIM and INFRATION PRESSURE defined in a YEARBOOX of 2002 of "TIRE and RIM ASSOCIATION (TRA)" were used. Here, the air pressure is 1620 kPa.

Cut resistance: a cutter having a width of 40 mm and a blade tip angle of 30° was pushed against a tire center portion of a tread vertically in the widthwise direction, and a cut depth was checked.

(Definition of Specified Load)

A load prescribed in the YEARBOOK of TRA 2002.

Here, the load is 24860 kg.

The evaluation is expressed using indices in which a reciprocal number of the cut-depth of the pneumatic radial tire of the conventional example 1 is set to 100. As the numerical value is greater, the cut resistance is more excellent.

Pressure tightness: tires were assembled to MEASURING RIMs prescribed in YEARBOOK of 2002 of TIRE and RIM ASSOCIATION (TRA), water was charged into the tire, and the water pressure was increased until the tire was broken. The evaluation is expressed using indices in which a pressure when the conventional tire was broken is set to 100. As the numerical value is greater, the pressure tightness is more excellent. The test tires will be described hereinafter.

Examples 1 to 3: the tires have the same structure as that of the pneumatic radial tire described in the first embodiment, but thicknesses of the belt layers are changed. Other details are described in the following Tables.

Example 4: the tire has the same structure as that of the pneumatic radial tire described in the first embodiment, but the organic fiber cord used for the belt ply of the auxiliary belt layer is changed to a hybrid cord. Other details are described in the following Tables.

Example 5: the tire has the same structure as that of the pneumatic radial tire described in the first embodiment, but the organic fiber cord used for the belt ply of the main belt layer is changed to a hybrid cord. Other details are described in the following Tables.

Example 6: the tire has the same structure as that of the pneumatic radial tire described in the first embodiment, but the organic fiber cord used for the belt ply of the main belt layer is changed to a hybrid cord, and the belt ply of the auxiliary belt layer is changed to an intersection belt. Other details are described in the following Tables.

Example 7: the tire has the same structure as that of the pneumatic radial tire described in the first embodiment, but the organic fiber cord used for the belt ply of the main belt layer is changed to a hybrid cord, and the belt ply of the auxiliary belt layer is changed to an endless zigzag belt. Other details are described in the following Tables.

Example 8: the tire has the same structure as that of the pneumatic radial tire described in the fourth embodiment (there is no auxiliary belt layer). Other details are described in the following Tables.

Example 9: the tire has the same structure as that of the pneumatic radial tire described in the fifth embodiment (two narrow belt plies are superposed on the outer side (outer side of the width position corresponding to ⅔ of the maximum width of the belt layer) in the radial direction of the tire in the vicinity of the opposite ends of the main belt layer). Other details are described in the following Tables.

Example 10: the tire has the same structure as that of the pneumatic radial tire described in the sixth embodiment (two narrow belt plies are superposed on the outer side (outer side of the width position corresponding to ⅔ of the maximum width of the belt layer) in the radial direction of the tire in the vicinity of the opposite ends of the main belt layer). Other details are described in the following Tables.

Example 11: the tire has the same structure as that of the pneumatic radial tire described in the first embodiment, but the organic fiber cord used for the belt ply of the main belt layer is changed to Kevlar, and the belt ply of the auxiliary belt layer is changed to an intersection belt. Other details are described in the following Tables.

Example 12: the tire has the same structure as that of the pneumatic radial tire described in the first embodiment. Other details are described in the following Tables.

Example 13: the tire has the same structure as that of the pneumatic radial tire described in the first embodiment. Other details are described in the following Tables.

Comparative examples 1 and 2: the tires have the same structure as that of the pneumatic radial tire described in the first embodiment, but thicknesses of the belt layers are different from the range limited by the invention. Other details are described in the following Tables.

Comparative example 3: the tire has the same structure as that of the pneumatic radial tire described in the first embodiment, but nylon cord was used as the organic fiber cord of the main belt layer. Other details are described in the following Tables.

Comparative example 4: the tire has the same structure as that of the pneumatic radial tire described in the first embodiment, but the number of belt plies of the main belt layer was increased and nylon cord was used as the organic fiber cord of the main belt layer. Other details are described in the following Tables.

Figure 11:
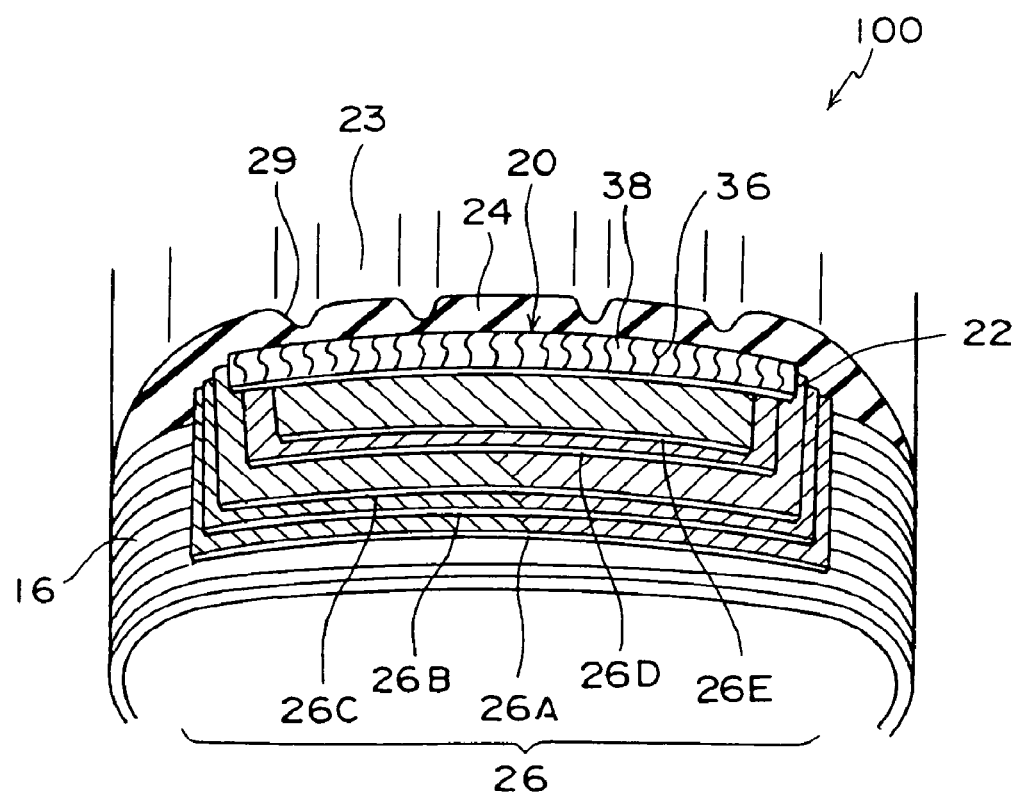
FIG. 11 is an exploded perspective view of a conventional pneumatic radial tire.
Figure 12:
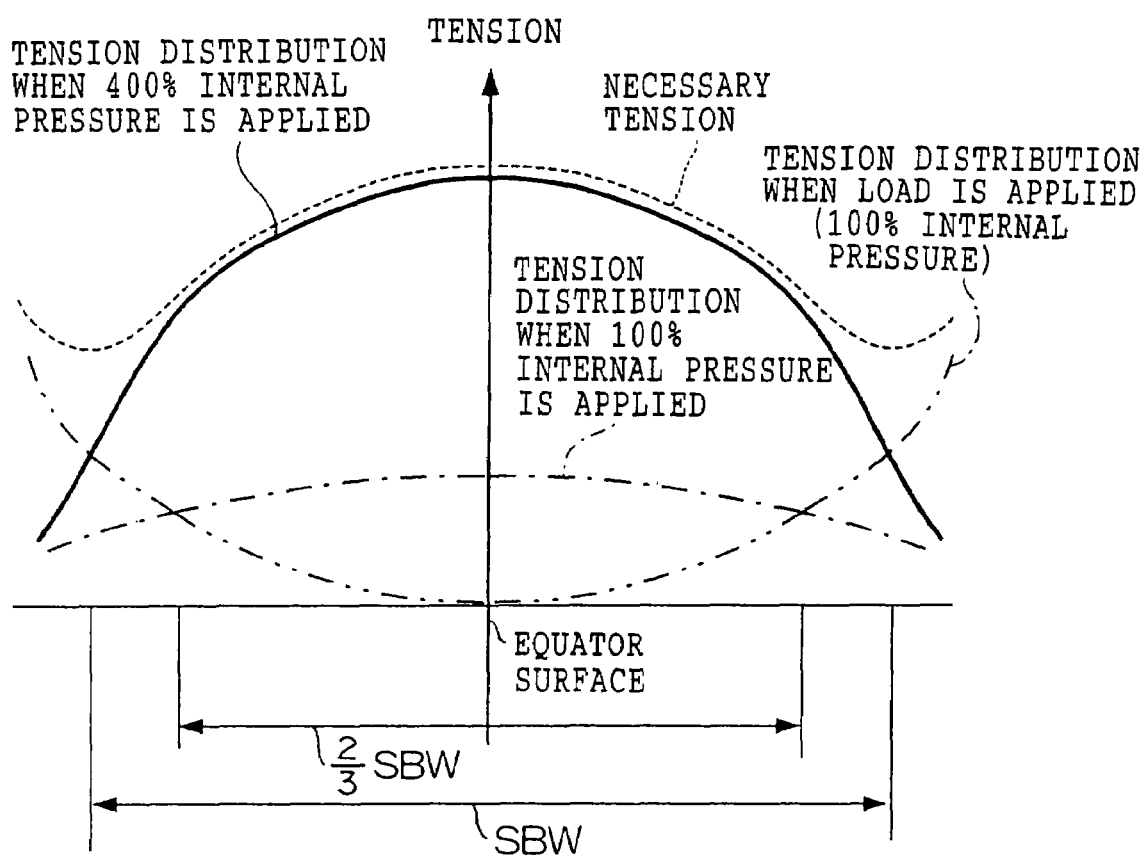
FIG. 12 is a graph showing tensions applied to a belt layer.

Conventional example: as shown in FIG. 11, in the conventional pneumatic radial tire 100, the carcass layer 16 is formed from seven carcass plies. The conventional main belt layer 26 is formed from three belt plies, i.e., the first belt ply 26A to the third belt ply 26C which are endless zigzag-wound belts as the main belt layer 26 of the pneumatic radial tire 42 according to the third embodiment, and the fourth belt ply 26D and the fifth belt ply 26E which constitute the intersection belt (the number of plies of the main belt layer 26 is counted as eight). However, unlike the pneumatic radial tire of the present invention, in the conventional pneumatic radial tire, a width thereof is reduced from the first belt ply 26A toward the fifth belt ply 26E, and the aliphatic polyamide cord is used as the organic fiber cord. Other details are described in the following Tables.

A method of producing the aliphatic polyamide organic fiber cord will be described hereinafter.

One thread in which two 66-nylon (1260 denier=1400 dtex) were combined, was subjected to an inner-laying process a laying machine so as the inner-layer coefficient becomes 0.4. Then, three inner-laid threads were neatly arranged, and were outer-laid in the direction opposite from that of the inner-layer such that the outer-layer coefficient became 0.47, and the laid cord process was carried out.

The laid cord was subjected to a dip processing using a cord processing machine produced by Kabushiki Kaisha Ichikin Kogyo, and the cord was produced. As the 66 nylon, polyamide fiber (trade name: 66-nylon, nominal denier of 1260 denier) produced by TORAY Kabushiki Kaisha was used.

A definition of a ground-contacting width TW in Tables is as follows.

The ground-contacting width: the ground-contacting width, using MEASURING RIM and INFRATION PRESSURE prescribed in the YEARBOOK of 2002 of TIRE and RIM ASSOCIATION (TRA), when 100% load is applied in a state in which substantially 100% internal pressure prescribed in the YEARBOOK is inflated.

TABLE 1

|  |  | Conventional example 1 | Comparative example 1 | Comparative example 2 | Comparative example 3 |
|---|---|---|---|---|---|
|  | Perspective view | FIG. 11 | FIG. 2 | ← | ← |
| Carcass | The number of plies | 7 | 6 | ← | ← |
|  | Cord type | Nylon | ← | ← | ← |
| Protective layer | Cord type | Kevlar | ← | ← | ← |
|  | Cord amplitude (mm) | 5 | ← | ← | ← |
|  | Cord wavelength (mm) | 27.5 | ← | ← | ← |
|  | Wavelength/amplitude (%) | 550 | ← | ← | ← |
|  | Belt width | 86% of ground-contact width | ← | ← | ← |
|  | Thickness of rubber layer (mm) | 2.5 | ← | ← | ← |
| Auxiliary belt layer | Type | Intersection belt | Endless zigzag wound | ← | ← |
|  | Cord type | Nylon | ← | ← | ← |
|  | Cord angle (°) | 15 | 8 | ← | ← |
|  | The number of plies | 2 | 2 | ← | ← |
|  | Belt width SBW | 71% of ground-contact width | 102% of ground-contact width | ← | ← |
| Main belt layer | Type | Endless zigzag wound | Spiral | ← | ← |
|  | Cord type | Nylon | Kevlar | ← | Nylon |
|  | Cord angle (°) | 10 | Substantially 0 | ← | ← |
|  | The number of plies | 6 | 8 | ← | ← |
|  | Belt width BW | 102% of ground-contact width | 98% of ground-contact width | ← | ← |
|  | G2/G0 | 1 | 0.26 | 0.91 | 0.64 |
|  | Tire weight | 100 | 89 | 99 | 93 |

TABLE 1-continued

|  | Conventional example 1 | Comparative example 1 | Comparative example 2 | Comparative example 3 |
|---|---|---|---|---|
| Tire outer diameter growth rate (%) | 7.0 | 2.1 | 1.9 | 7.5 |
| Cut resistance | 100 | 159 | 162 | 97 |
| Pressure tightness | 100 | 95 | 107 | 98 |

TABLE 2

| | | Comparative example 4 | Example 1 | Example 2 | Example 3 |
|---|---|---|---|---|---|
| | Perspective view | FIG. 2 | ← | ← | ← |
| Carcass | The number of plies | 6 | ← | ← | ← |
| | Cord type | Nylon | ← | ← | ← |
| Protective layer | Cord type | Kevlar | ← | ← | ← |
| | Cord amplitude (mm) | 5 | ← | ← | ← |
| | Cord wavelength (mm) | 27.5 | ← | ← | ← |
| | Wavelength/amplitude (%) | 550 | ← | ← | ← |
| | Belt width | 86% of ground-contact width | ← | ← | ← |
| | Thickness of rubber layer (mm) | 2.5 | ← | ← | ← |
| Auxiliary belt layer | Type | Endless zigzag wound | ← | ← | ← |
| | Cord type | Nylon | ← | ← | ← |
| | Cord angle (°) | 8 | ← | ← | ← |
| | The number of plies | 2 | ← | ← | ← |
| | Belt width SBW | 102% of ground-contact width | ← | ← | ← |
| Main belt layer | Type | Spiral | ← | ← | ← |
| | Cord type | Nylon | Kevlar | ← | ← |
| | Cord angle (°) | Substantially 0 | ← | ← | ← |
| | The number of plies | 16 | 8 | ← | ← |
| | Belt width BW | 98% of ground-contact width | ← | ← | ← |
| | G2/G0 | 0.58 | 0.63 | 0.45 | 0.81 |
| | Tire weight | 105 | 93 | 91 | 95 |
| | Tire outer diameter growth rate (%) | 3.8 | 2.0 | 2.2 | 1.9 |
| | Cut resistance | 132 | 160 | 159 | 162 |
| | Pressure tightness | 105 | 103 | 100 | 105 |

TABLE 3

| | | Comparative example 4 | Example 5 | Example 6 | Example 7 |
|---|---|---|---|---|---|
| | Perspective view | FIG. 2 | ← | FIG. 6 | FIG. 7 |
| Carcass | The number of plies | 6 | ← | ← | ← |
| | Cord type | Nylon | ← | ← | ← |
| Protective layer | Cord type | Kevlar | ← | ← | ← |
| | Cord amplitude (mm) | 5 | ← | ← | ← |
| | Cord wavelength (mm) | 27.5 | ← | ← | ← |
| | Wavelength/amplitude (%) | 550 | ← | ← | ← |
| | Belt width | 86% of ground-contact width | ← | ← | ← |
| | Thickness of rubber layer (mm) | 2.5 | ← | ← | ← |
| Auxiliary belt layer | Type | Endless zigzag wound | ← | Intersection belt | Endless zigzag wound |
| | Cord type | Hybrid | Nylon | ← | ← |
| | Cord angle (°) | 8 | ← | 15 | 8 |
| | The number of plies | 2 | ← | 2 | ← |
| | Belt width SBW | 102% of ground-contact width | ← | ← | ← |
| Main belt layer | Type | Spiral | ← | ← | Endless zigzag wound |
| | Cord type | Kevlar | Hybrid | ← | ← |
| | Cord angle (°) | Substantially 0 | ← | ← | 10 |
| | The number of plies | 8 | ← | ← | ← |
| | Belt width BW | 98% of ground-contact width | ← | ← | ← |
| | G2/G0 | 0.64 | 0.63 | 0.61 | 0.63 |
| | Tire weight | 93 | 93 | 93 | 93 |
| | Tire outer diameter growth rate (%) | 1.8 | 3.2 | 3.5 | 3.4 |
| | Cut resistance | 163 | 142 | 137 | 139 |
| | Pressure tightness | 106 | 102 | 100 | 100 |

TABLE 4

|  |  | Example 8 | Example 9 | Example 10 | Example 11 |
|---|---|---|---|---|---|
| Carcass | Perspective view | FIG. 8 | FIG. 9 | FIG. 10 | FIG. 6 |
|  | The number of plies | 6 | ← | ← | ← |
|  | Cord type | Nylon | ← | ← | ← |
| Protective layer | Cord type | Kevlar | ← | ← | ← |
|  | Cord amplitude (mm) | 5 | ← | ← | ← |
|  | Cord wavelength (mm) | 27.5 | ← | ← | ← |
|  | Wavelength/amplitude (%) | 550 | ← | ← | ← |
|  | Belt width | 86% of ground-contact width | ← | ← | ← |
|  | Thickness of rubber layer (mm) | 2.5 | ← | ← | ← |
| Auxiliary belt layer | Cord type | — | Endless zigzag wound | Endless zigzag wound | Intersection belt |
|  | Cord type | — | Nylon | ← | ← |
|  | Cord angle (°) | — | 8 | ← | 15 |
|  | The number of plies | — | 2 | 2 | ← |
|  | Belt width SBW | — | 102% of ground-contact width | ← | ← |
| Main belt layer | Type | Spiral | Spiral + belt end spiral | Endless zigzag wound + belt end spiral | Spiral |
|  | Cord type | Kevlar | ← | ← | ← |
|  | Cord angle (°) | Substantially 0 | Substantially 0 | Endless zigzag wound: 10 spiral: substantially 0 | Substantially 0 |
|  | The number of plies | 8 | 8 + (4) Note 1) | ← | 8 |
|  | Belt width BW | 98% of ground-contact width | ← | ← | ← |
|  | G2/G0 | 0.56 | 0.63 | 0.63 | 0.61 |
|  | Tire weight | 88 | 93 | 93 | 93 |
|  | Tire outer diameter growth rate (%) | 2.4 | 2.3 | 3.4 | 2.3 |
|  | Cut resistance | 155 | 157 | 139 | 157 |
|  | Pressure tightness | 101 | 103 | 100 | 102 |

Note 1) (4) of 8 + (4) means that two narrow width belt plies are laminated on each end of the main belt layer.

TABLE 5

|  |  | Example 12 | Example 13 |
|---|---|---|---|
| Carcass | Perspective view | FIG. 2 | ← |
|  | The number of plies | 5 | ← |
|  | Cord type | Kevlar | Hybrid |
| Protective layer | Cord type | Kevlar | ← |
|  | Cord amplitude (mm) | 5 | ← |
|  | Cord wavelength (mm) | 27.5 | ← |
|  | Wavelength/amplitude (%) | 550 | ← |
|  | Belt width | 86% of ground-contact width | ← |
|  | Thickness of rubber layer (mm) | 2.5 | ← |
| Auxiliary belt layer | Type | Endless zigzag wound | ← |
|  | Cord type | Nylon | ← |
|  | Cord angle (°) | 8 | ← |
|  | The number of plies | 2 | ← |
|  | Belt width SBW | 102% of ground-contact width | ← |
| Main belt layer | Type | Spiral | ← |
|  | Cord type | Kevlar | ← |
|  | Cord angle (°) | Substantially 0 | ← |
|  | The number of plies | 8 | ← |
|  | Belt width BW | 98% of ground-contact width | ← |
|  | G2/G0 | 0.63 | ← |
|  | Tire weight | 89 | 89 |
|  | Tire outer diameter growth rate (%) | 1.8 | 1.9 |
|  | Cut resistance | 163 | 161 |
|  | Pressure tightness | 105 | 105 |

As a result of the test, it can be noticed that the pneumatic radial tires of the Examples 1 through 13 are lightweight and have excellent cut resistance as compared with the conventional tire.

Unless the tire weight is equal to or less than 95, it is impossible to have advantage in the market.

Seventh Embodiment

Next, a pneumatic radial tire 52 of a seventh embodiment of the invention will be described with reference to FIGS. 15 to 17. The components same as those of the previous embodiments are designated with the same symbols, and explanation thereof is omitted.

In the pneumatic radial tire 52 of the present embodiment, a carcass layer 16 which extends in a toroidal form is disposed between the bead cores 14 disposed in the bead portion 12. The belt layer 20 is disposed between the tread rubber layer 24 and the crown region of the carcass layer 16 formed of one or more carcass plies comprising organic fiber cords extending substantially in the radial direction. A total thickness t of the belt layer 20 is formed thicker than that of the side portion of the central portion in the widthwise direction, and the belt layer 20 is formed of the auxiliary belt layer 28, which is located radially outer side, and the main belt layer 26, which is located radially inner side.

Figure 16:
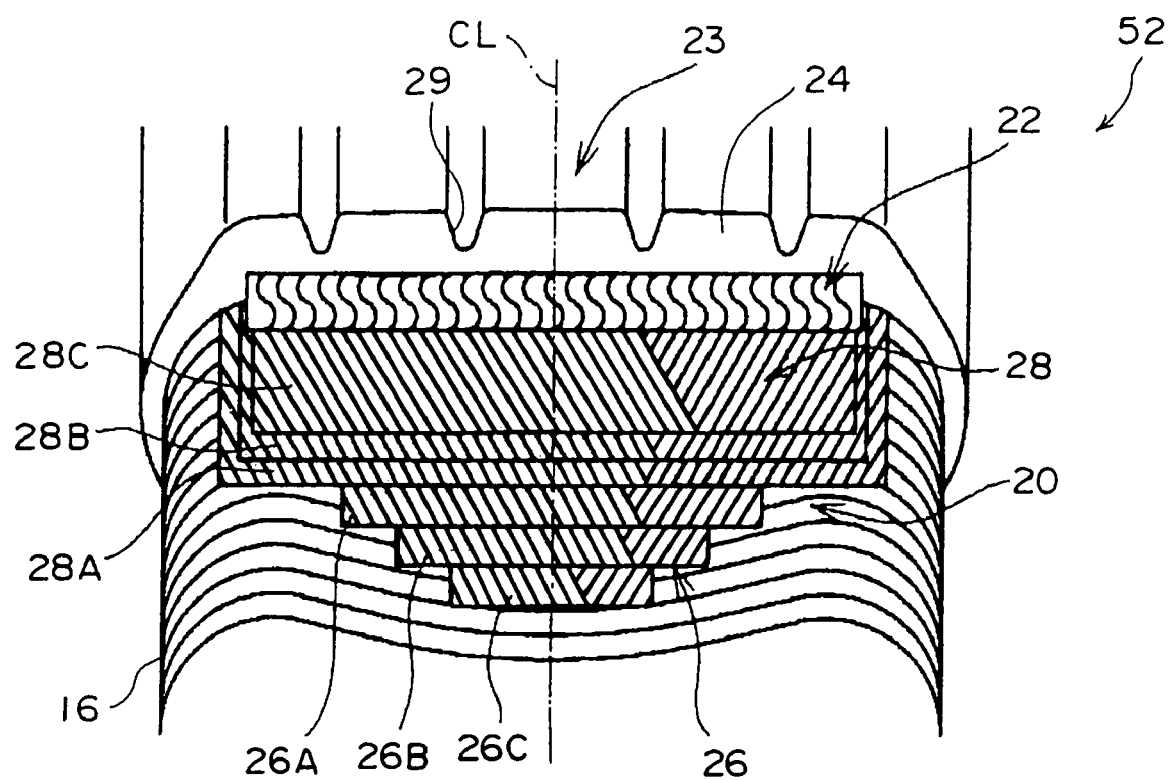
FIG. 16 is an essential sectional perspective view of the pneumatic radial tire of the seventh embodiment.

As shown in the sectional perspective view of an essential portion of the auxiliary belt layer 28 in FIG. 16, the auxiliary belt layer 28 is formed of a plurality of (three in FIG. 16) belt plies 28A, 28B and 28C whose width is gradually reduced towards the outer side in the radial direction. A maximum width $w_0$ is set in a range of 60 to 90% of the maximum width W of the pneumatic radial tire 52 which is assembled to a rim and into which prescribed internal pressure (TRA) is charged.

Here, the reason why the maximum width $w_0$ of the auxiliary belt layer 28 is set in the range of 60 to 90% of the maximum width W is that if the maximum width $w_0$ of the auxiliary belt layer 28 exceeds 90% of the maximum width W of the tire, it becomes difficult to construct a tire which has a tread portion having a slightly narrower width with respect to the maximum width of the tire, and will bring trouble. On the other hand, if the maximum width $w_0$ of the auxiliary belt layer 28 is less than 60% of the tire maximum width W, the belt rigidity at the tread side region is lowered, and the high speed endurance will be largely deteriorated.

As also shown in FIG. 16, the main belt layer 26 is formed of, for example, three belt plies 26A, 26B and 26C whose width is gradually reduced towards the inner side in the radial direction, and the maximum width $w_1$ is set in a range of 15 to 60% of the tire maximum width W.

The reason why the maximum width $w_1$ of the main belt layer 26 is set in the range of 15 to 60% of the tire maximum width W, as mentioned above, for the attempt to effectively restrain the swelling deformation of the tread central region while restricting increment of the weight.

Further, in the main belt layer 26, each of the belt plies 26A, 26B and 26C are formed of endless zigzag-wound belts (see FIG. 5), and cut ends of cords are removed from the belt plies 26A, 26B and 26C.

Further, in the auxiliary belt layer 28, each of the belt plies 28A, 28B and 28C are formed of endless zigzag-wound belts (see FIG. 5), and cut ends of cords are removed from the belt plies 28A, 28B and 28C.

Figure 4:
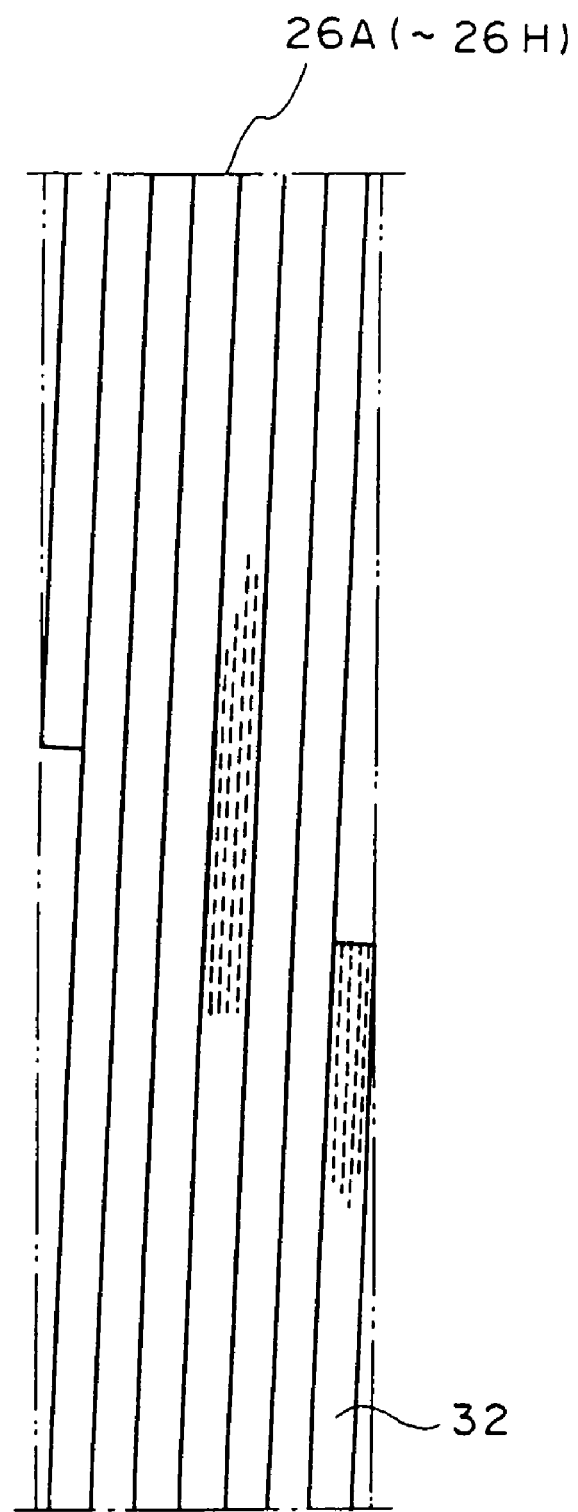
FIG. 4 is a plan view of a spiral belt.

Note that, the cord cut end can be removed using spiral belts (see FIG. 4).

Figure 17:
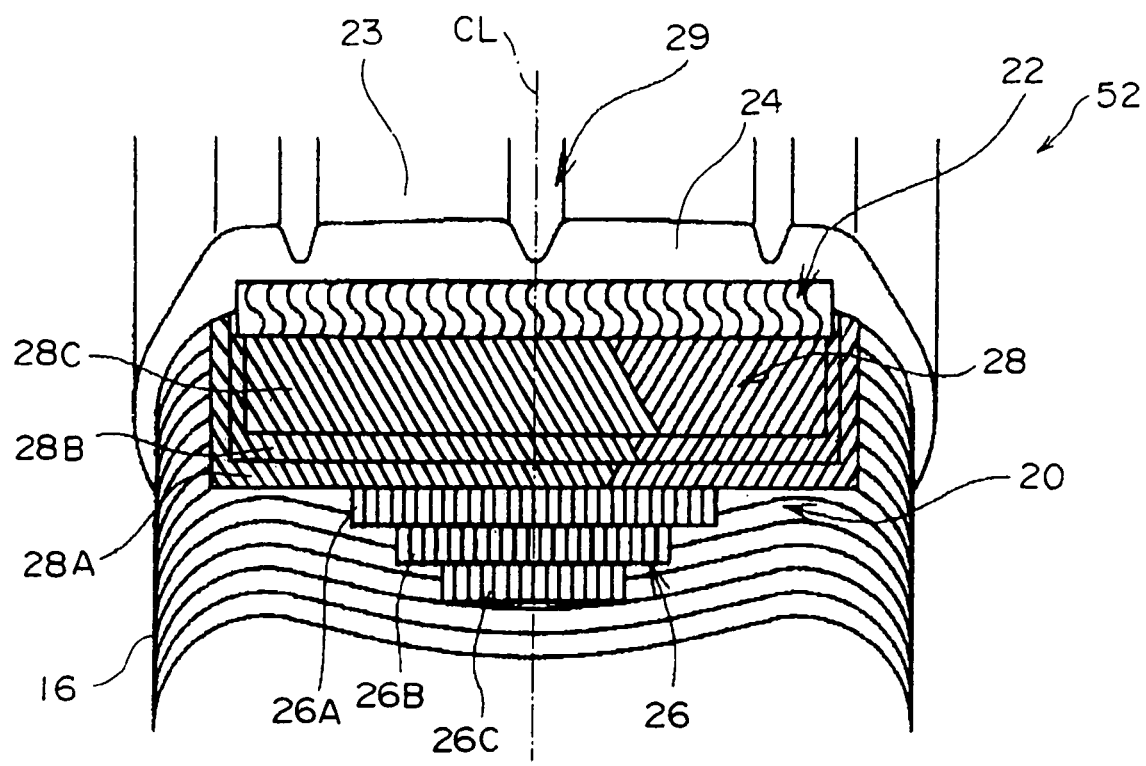
FIG. 17 corresponds to FIG. 16 and shows another example of a structure of the belt ply.

FIG. 17 is a sectional perspective view of an essential portion showing each of the belt plies 26A, 26B and 26C of the main belt layer 26 formed in this manner.

In any cases, the angle of the belt ply cord with respect to the tire equator surface CL is set to 25° or less. This is because that the main role of the belt in the radial tire is to secure the rigidity of the tire in the circumferential direction thereof (the carcass layer mainly undertakes the rigidity in the radial direction), and if the angle of the belt ply cord with respect to the tire equator surface CL exceeds 25°, the rigidity in the circumferential direction will be reduced, and in order to secure necessary rigidity, it will be necessary to increase the number of belt plies, and the weight of the tire will increase.

Needless to say, cords constituting the belt plies 26A, 26B and 26C and belt plies 28A, 28B and 28C of the belt layer 20 can be formed of aromatic polyamide organic fiber cords of other kinds of organic fiber cords. However, cords having elastic modulus in a range of 100 to 700% of the organic fiber cord forming the carcass ply is preferable, and cords constituting the belt plies 26A, 26B and 26C of the main belt layer 26 are preferable to be formed of aromatic polyamide organic fiber cords.

It is preferable that in the pneumatic radial tire 52, the protective belt layer 22 is disposed between the belt layer 20 and the tread rubber layer 24, and the protective belt layer 22 being formed of non-metal cords, e.g., aromatic polyamide cords which extend in the circumferential direction in a zigzag form and which have tensile strength of 1000 MPa or higher with amplitude of 5 to 25 mm and with wavelength of 200 to 700% of the amplitude.

Figure 15:
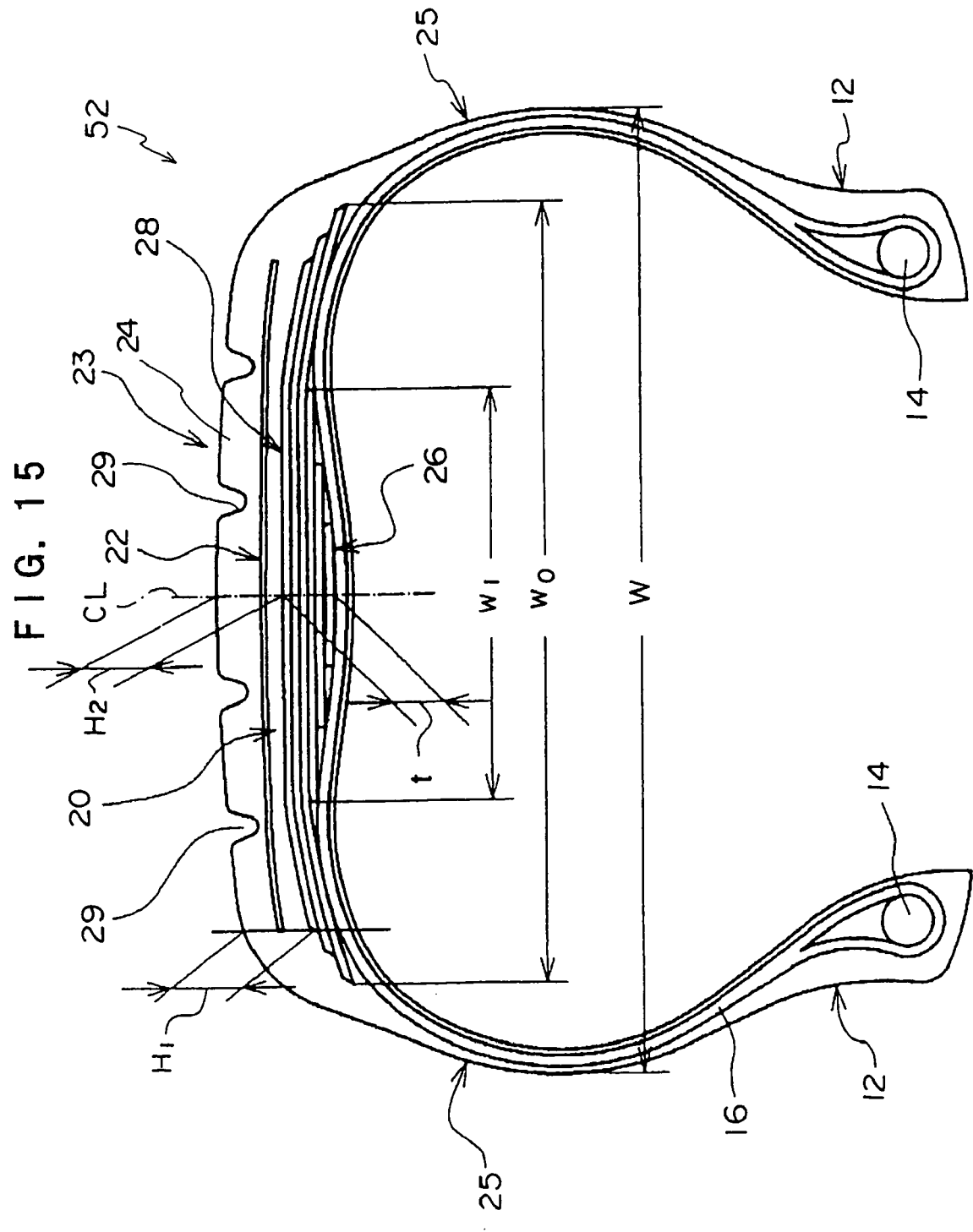
FIG. 15 is a sectional view of a pneumatic radial tire according to a seventh embodiment.

According to the pneumatic radial tire 52 having such a structure, as shown in FIG. 15, a rubber thickness $H_1$ of the tread side region on an outer peripheral side of the auxiliary belt layer 28 is set substantially equal to a rubber thickness $H_2$ of the tread central region, in order to restrain increment of the tire weight effectively, and the swelling deformation of the tread central region when the internal pressure is charged and when the pneumatic radial tire 52 rotates with load applied thereto can be advantageously prevented by the main belt layer 26. Therefore, the swelling deformation amount of the tread rubber layer 24 is sufficiently uniformed in the widthwise direction thereof, and wear of the tread central region in an early stage and uneven-wear of the tread side region can be effectively prevented, and the endurance against the sticking of foreign matter can be enhanced under easement of the elongation amount of the tread rubber layer 24 at the tread central region.

The rubber thickness $H_1$ of the tread side region is "$H_1$=the distance from the tread to the outer peripheral surface of the auxiliary belt layer 28 which is measured at the 90% point of the ground-contacting width in a standard condition of the tire—the cord diameter of the protective belt layer".

Further, the rubber thickness $H_2$ of the tread central region is "the dimension measured, on the tire equator surface CL, from the outer peripheral surface of the auxiliary belt layer 28 to the tread in the radial direction of the tire—the cord diameter of the protective belt layer 22".

Moreover, since none of the belt plies 26A, 26B and 26C of the main belt layer 26 have cord cut ends at the side edges thereof, when a load in the widthwise direction of the tread is applied, the separation of the belt plies 26A, 26B and 26C can effectively be prevented, and largely enhance the belt endurance.

The ground-contacting width in the standard state of the tire: the ground-contacting width, using MEASURING RIM and INFRATION PRESSURE prescribed in the YEARBOOK of 2002 of TIRE and RIM ASSOCIATION (TRA), when 100% load is applied in a state in which substantially 100% internal pressure prescribed in the YEARBOOK is inflated.

Eighth Embodiment

Figure 18:
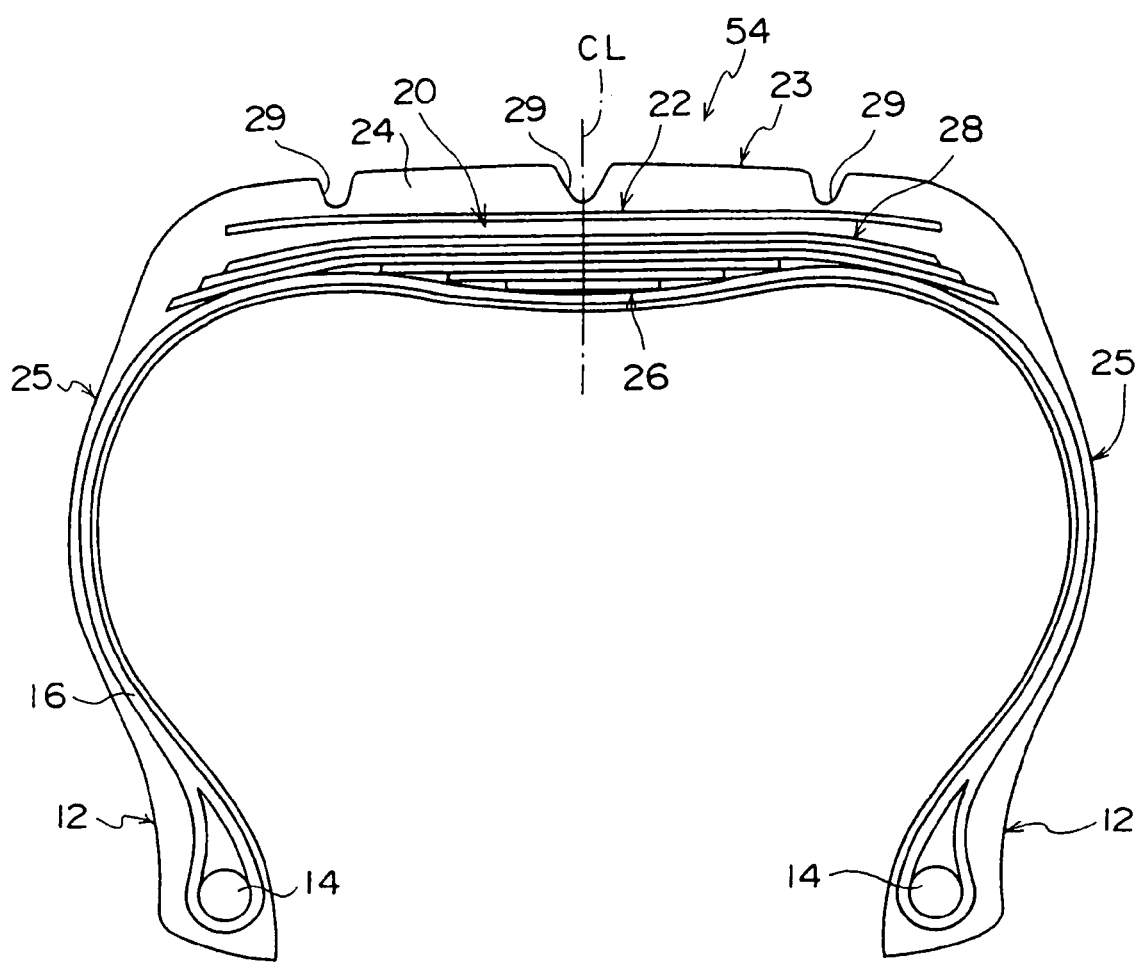
FIG. 18 is a sectional view of a pneumatic radial tire according to an eighth embodiment.

Next, a pneumatic radial tire 54 of an eighth embodiment of the invention will be described with reference to FIG. 18. The pneumatic radial tire 54 of the present embodiment is a modification of the seventh embodiment, and the components same as those of the seventh embodiment are designated with the same symbols, and explanation thereof is omitted.

In the pneumatic radial tire 54 of the present embodiment, one of the plural circumferential grooves 29 formed in the tread portion 23 is extended along the tread central portion.

In this way, there is an advantage that positions of other circumferential grooves 29 can be easily offset from the vicinity of the side edge of the main belt layer 26.

When the pneumatic radial tire 52 of the seventh embodiment and the pneumatic radial tire 54 of the eighth embodiment are to be manufactured, in either tires, it is preferable to mold a green tire, for example, on eight to twelve divided type rigid core having an outer surface shape which corresponds to an inner shape of a product tire, and inserting the green tire into the mold together with the rigid core, and vulcanize, in order to enhance size precision of each parts of the tire.

Note that, the rigid core can be taken out from the vulcanized product tire by disassembling the rigid core into segments.

Figure 19:
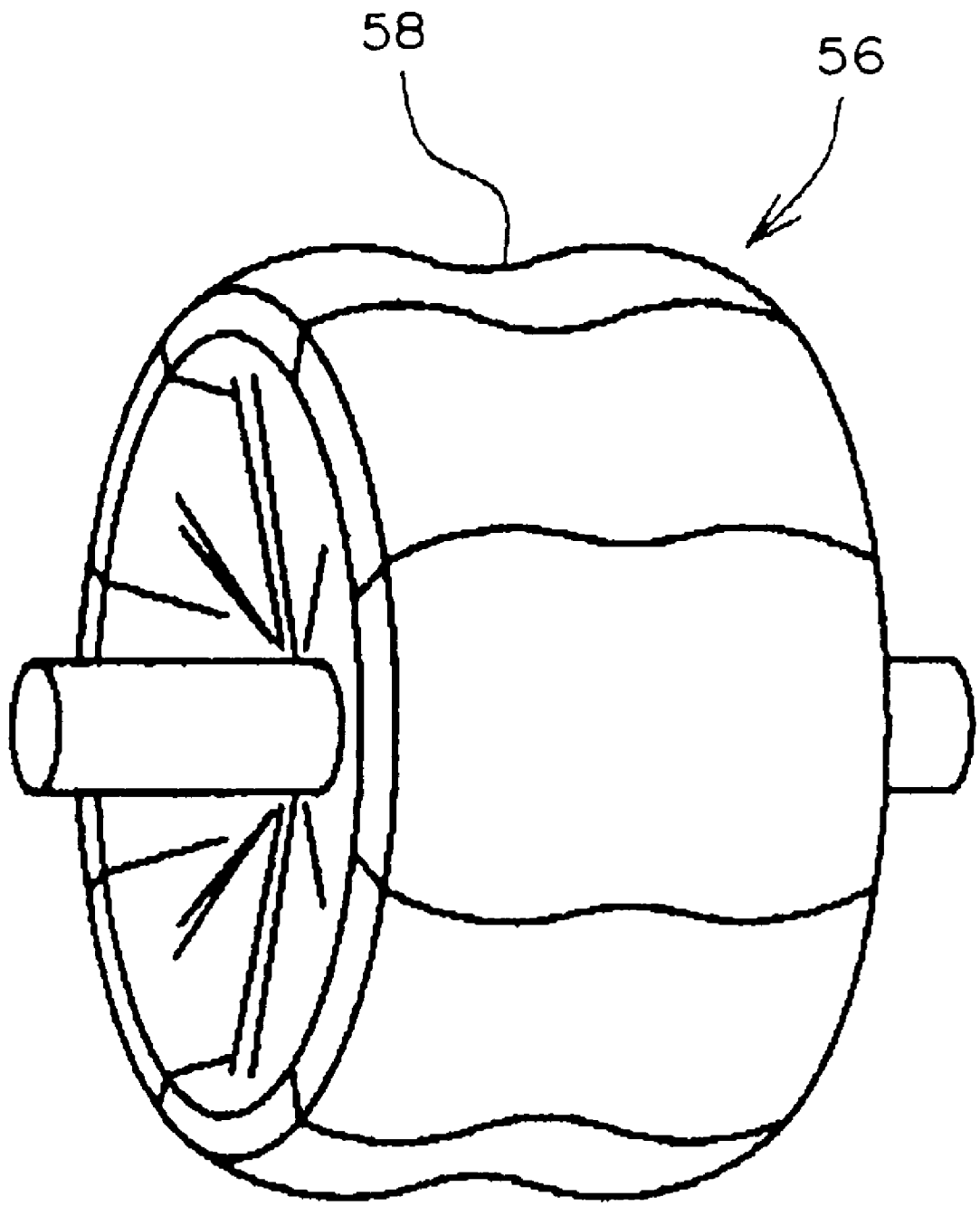
FIG. 19 is a perspective view showing a belt-molding drum.

On the other hand, when the belt layer 20 is molded alone, or molded together with the tread rubber layer 24 on a separate belt-molding drum, it is preferable to mold the main belt layer 26 within an annular recess 58 provided in the central portion of the belt-molding drum 56 in the widthwise direction thereof, in order to reduce deformation amount of the auxiliary belt layer 28 until the product tire is obtained, as shown in FIG. 19.

Test Example 2

In aircraft radial tires of a size of 50×20.0R22, example tires, a comparative tire, and a conventional tire in which structures thereof were changed as shown in Table 6,and various performance was measured, and a result shown in Table 7 was obtained.

The comparative tire: the comparative tire is a pneumatic radial tire having a structure shown in FIG. 20. The belt structure is different from that of the example tire.

The conventional tire: the conventional tire is a pneumatic radial tire having a structure shown in FIG. 21. The belt structure is different from that of the example tire.

TABLE 6

Figure 21A:
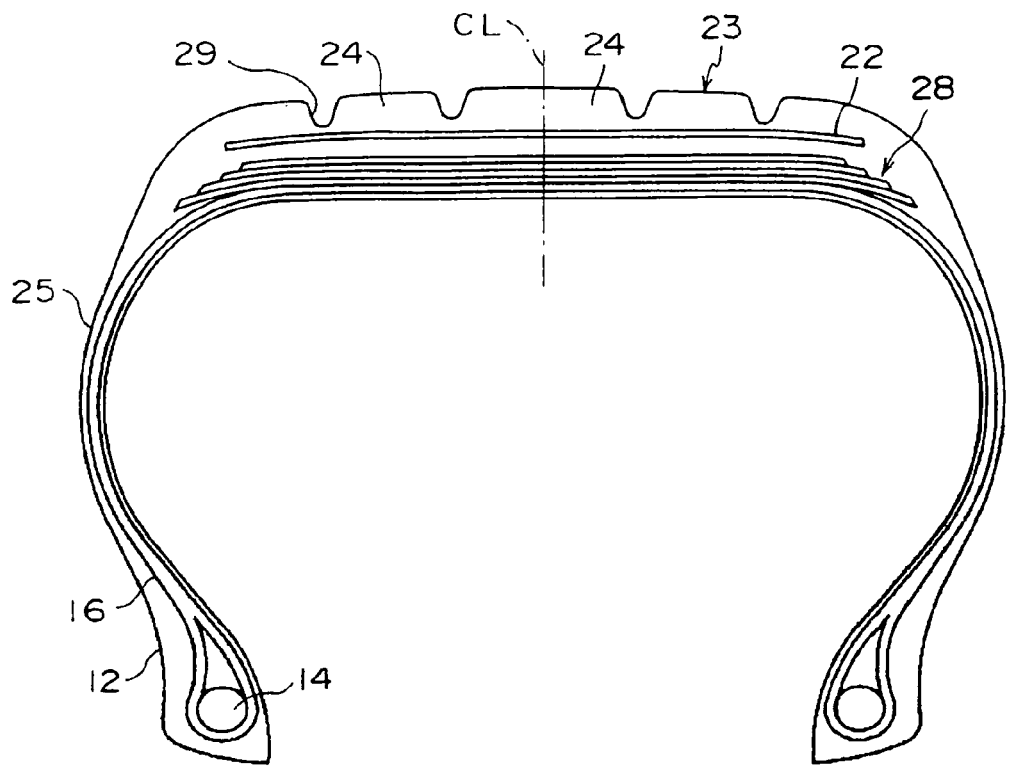
FIG. 21A is a sectional view of a conventional pneumatic radial tire.
Figure 21B:
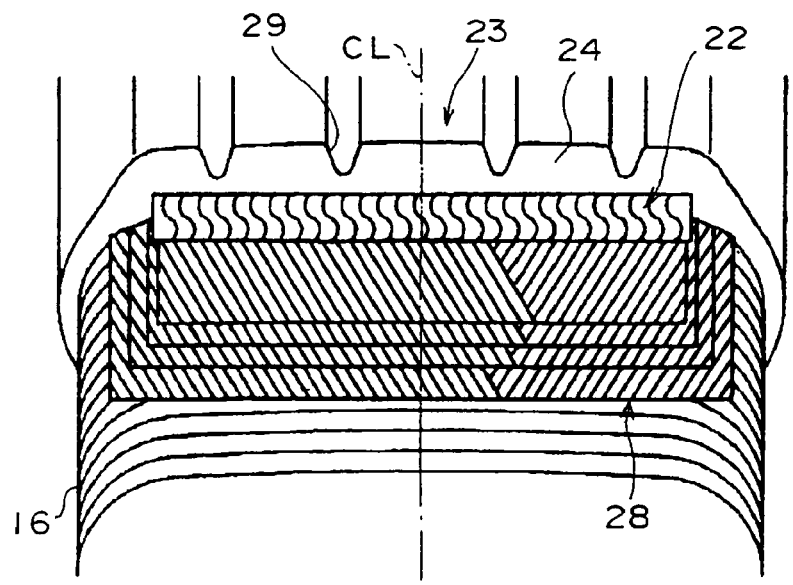
FIG. 21B is an essential sectional perspective view of the conventional pneumatic radial tire.
Figure 22:
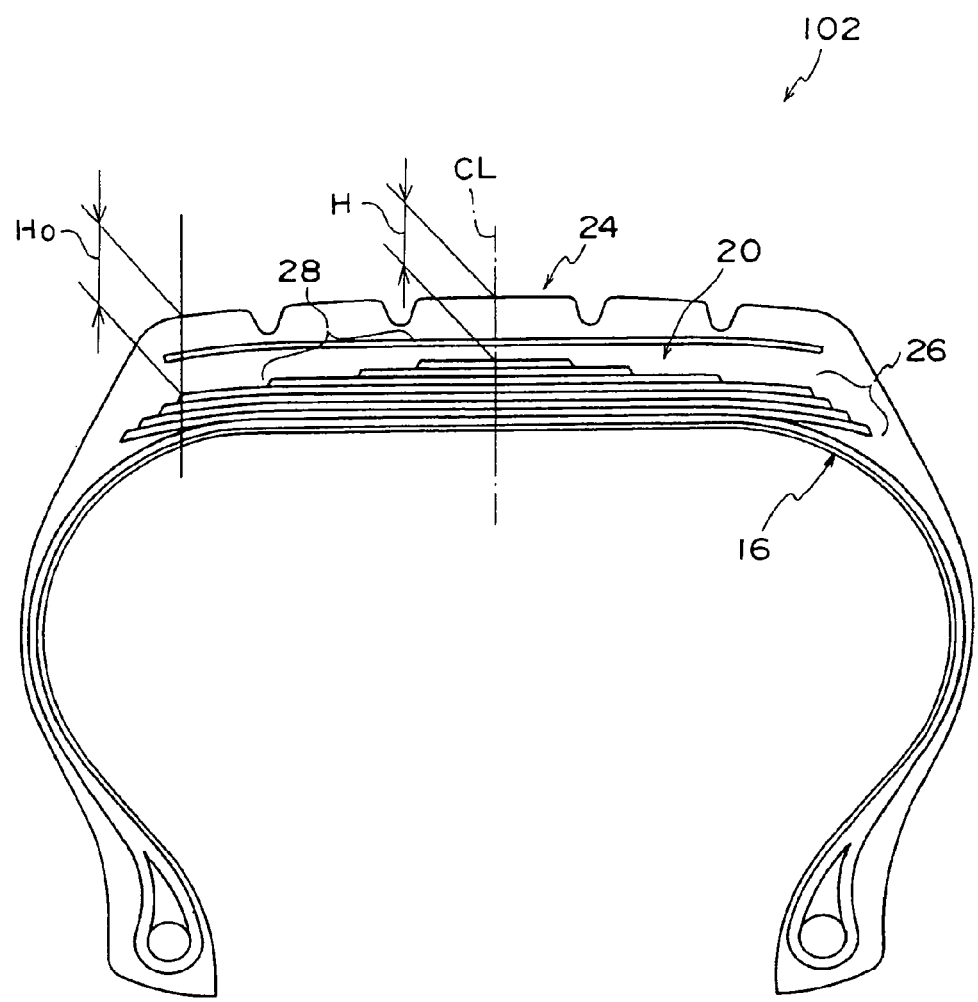
FIG. 22 is a sectional view of another conventional pneumatic radial tire.

|  |  |  | Example tire 14 | Example tire 15 | Comparative tire 5 | Conventional tire 2 |
|---|---|---|---|---|---|---|
|  | Tire sectional view (conception) |  | FIG. 15 | FIG. 15 | FIG. 15 | FIG. 21A |
|  | Sectional perspective view (conception) |  | FIG. 16 | FIG. 17 | FIG. 20 | FIG. 21B |
| Tire structure | Carcass | Cord material | Nylon | ← | ← | ← |
|  |  | The number of plies | 6 |  |  |  |
|  | Auxiliary belt layer | Cord angle | 88° or 92° | ← | ← | ← |
|  |  | Cord material | Nylon | ← | ← | Nylon |
|  |  | The number of layers | 6 |  |  | 8 |
|  |  | Structure | Endless zigzag wound | ← | ← | ← |
|  |  | Cord angle | 8° |  |  |  |
|  |  | Maximum width | 80% of tire maximum width | ← | ← | ← |
|  | Main belt layer | Cord material | Nylon | ← | ← | None |
|  |  | The number of plies | 6 |  |  |  |
|  |  | Structure | Endless zigzag wound | Spiral | Intersection belt |  |
|  |  | Cord angle | 8° | Substantially 0° | 15° |  |
|  |  | Maximum width | 45% of tire maximum width | ← | ← |  |
|  | Protective belt layer |  | Kevlar (trademark) Amplitude of 5 mm Wavelength of 27.5 mm | ← | ← | ← |

TABLE 7

Figure 23:
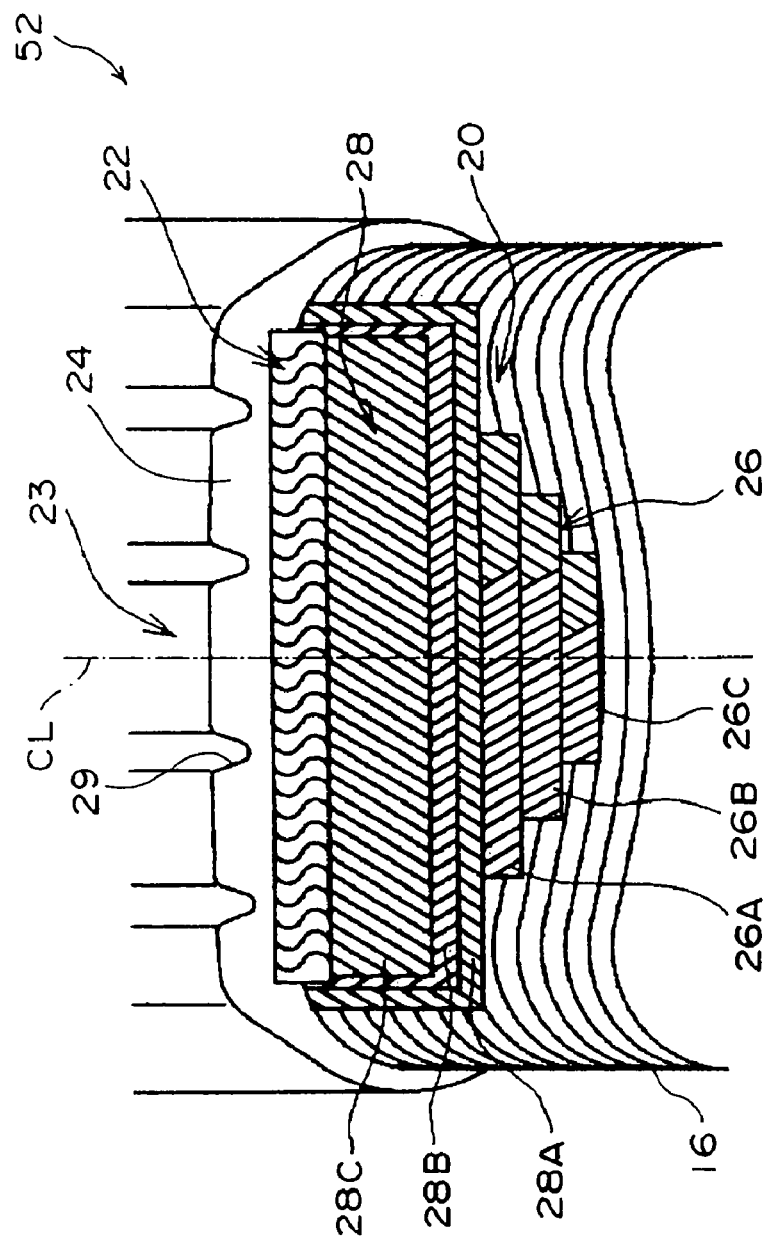
FIG. 23 corresponds to FIG. 16 and shows another example of a structure of the belt ply.

|  |  |  | Example tire 16 | Example tire 17 |
|---|---|---|---|---|
|  | Tire sectional view (conception) |  | FIG. 15 | FIG. 15 |
|  | Sectional perspective view (conception) |  | FIG. 17 | FIG. 23 |
| Tire structure | Carcass | Cord material | Nylon | ← |
|  |  | The number of plies | 6 |  |
|  |  | Cord angle | 88° or 92° | ← |
|  | Auxiliary belt layer | Cord material | Nylon | ← |
|  |  | The number of layers | 6 |  |
|  |  | Structure | Endless zigzag wound | Intersection belt |
|  |  | Cord angle | 8° | 15° |
|  |  | Maximum width | 80% of tire maximum width | ← |
|  | Main belt layer | Cord material | Kevlar | Nylon |
|  |  | The number of plies | 6 | 6 |
|  |  | Structure | Spiral | Endless zigzag wound |
|  |  | Cord angle | Substantially 0° | 10° |
|  |  | Maximum width | 45% of tire maximum width | ← |
|  | Protective belt layer |  | Kevlar (trademark) Amplitude of 5 mm Wavelength of 27.5 mm | ← |

TABLE 8

|  |  |  | Example tire 14 | Example tire 15 | Comparative tire 5 | Comparative tire 2 |
|---|---|---|---|---|---|---|
| Tire performance | Tire diameter increasing ratio *1 | central region | 4.3% | 4.0% | 4.2% | 6.0% |
|  |  | side region | 4.4% | 4.4% | 4.5% | 4.0% |
|  | Cut resistance *2 |  | 124 | 130 | 127 | 110 |
|  | Wear life *3 |  | 119 | 119 | 119 | 100 |
|  | The number of Taxi tests *4 with slip angle |  | 105 | 109 | 86 | 100 |

TABLE 9

|  |  |  | Example tire 16 | Example tire 17 |
|---|---|---|---|---|
| Tire perfor- mance | Tire diameter increasing ratio *1 | central region | 3.2% | 4.9% |
|  |  | side region | 2.8% | 4.7% |
|  | Cut resistance *2 |  | 140 | 118 |
|  | Wear life *3 |  | 122 | 121 |
|  | The number of Taxi tests *4 with slip angle |  | 112 | 105 |

*1 The increasing rate of outer diameter of each portion of the tire before and after the air pressure is charged (as the increasing rate is smaller, the tension of the tread rubber is smaller, and as a difference between the increasing rates of the tire central region and side region is smaller, the tire growth is more uniform).
*2 The same test method and evaluation as those of the test example 1.
*3 The number of takeoff and landing until a tire is completely worn in a test using an actual aircraft is expressed using indices in which the conventional tire 2 is set to 100 (as the numerical value is greater, the performance is more excellent).
*4 The number of tests carried out until the tire is broken is expressed using indices in which the conventional tire 2 is set to 100 (the test is an indoor drum test under conditions of internal pressure specified value of 92%, load specified value of 85%, slip angle of 1.5°, test speed of 64 km/h, running time of 4 minutes, and cycle of 120 minutes) (as the numerical value is greater, the performance is more excellent).

It is apparent from Table 7 that in all of the example tires have excellent wear endurance, and high endurance against lateral load.

INDUSTRIAL APPLICABILITY

As described above, the pneumatic radial tire of the invention is suitably used for an aircraft.

The invention claimed is:

1. A pneumatic radial tire comprising a pair of bead cores, a carcass layer comprising one or more carcass plies extending from one of the bead cores to the other bead core in a toroidal form, and a belt layer comprising at least one belt ply including an organic fiber cord on an outer peripheral surface of a crown region on an outer side of the carcass layer in a radial direction of the tire, wherein the belt layer comprises a main belt layer formed of at least two belt plies including an organic fiber cord having a tensile fracture strength of 6.3 cN/dtex or higher, an elongation percentage of 0.2 to 2.0% when 0.3 cN/dtex load is applied in an elongating direction, an elongation percentage of 1.5 to 7.0% when 2.1 cN/dtex load is applied in the elongating direction, and an elongation percentage of 2.2 to 9.3% when 3.2 cN/dtex load is applied in the elongating direction, and an auxiliary belt layer provided at an outer side of the main belt layer in the radial direction of the tire and comprising a belt ply including an organic fiber cord whose elongation percentage when 2.1 cN/dtex load is applied is greater than that of the organic fiber cord included in the belt ply of the main belt layer, whose angle with respect to the tire equator surface is substantially equal to or greater than that of the organic fiber cord included in the belt ply of the main belt layer, and the organic fiber cord included in the belt ply of the auxiliary belt layer is a different kind of cord material from the organic fiber cord included in the belt ply of the main belt layer, and when a total strength of the belt layer in a circumferential direction of the tire per unit of width at a tire equator surface position P0 is defined as K0 and a total strength of the belt layer in the circumferential direction of the tire per unit of width at a width position P2 corresponding to ⅔ of a maximum width of the belt layer having the tire equator surface as a center is defined as K2, a relation of K2<K0 is satisfied.

2. A pneumatic radial tire according to claim 1, wherein a relation of 0.2<K2/K0≦0.8 is satisfied.

3. A pneumatic radial tire according to claim 1 wherein a laminated layer thickness of the organic fiber cord in the belt layer is made to be greatest at the tire equator surface position P0, and when the laminated layer thickness of the organic fiber cord at the tire equator surface position P0 is defined as G0 and a laminated layer thickness of the organic fiber cord at the width position P2 corresponding to ⅔ of the maximum width of the belt layer is defined as G2, a relation of G2<G0 is satisfied.

4. A pneumatic radial tire according to claim 3, wherein a relation of 0.35≦G2/G0≦0.85 is satisfied.

5. A pneumatic radial tire according to claim 1, wherein in the belt layer, when the laminated layer thickness of the organic fiber cord at the width position P2 corresponding to ⅔ of the maximum width of the belt layer is defined as G2, the belt layer is provided with a portion having a laminated layer thickness which is thicker than the laminated layer thickness G2 in a region at an outer side of the width position P2 corresponding to ⅔ of the maximum width of the belt layer in the widthwise direction of the tire.

6. A pneumatic radial tire according to claim 1, wherein at least two belt layers are laminated at an end portion of the main belt layer in the widthwise direction of the tire.

7. A pneumatic radial tire according to claim 1, wherein the main belt layer has a belt ply including an organic fiber cord which is formed of aromatic polyamide fiber and has an inner-layer coefficient of 0.12 to 0.85 and an outer-layer coefficient of 0.40 to 0.80.

8. A pneumatic radial tire according to claim 1, wherein the main belt layer has a belt ply including an organic fiber cord which includes aromatic polyamide fiber and aliphatic polyamide fiber, and a weight ratio of the aromatic polyamide fiber and the aliphatic polyamide fiber is from 100:10 to 100:170.

9. A pneumatic radial tire according to claim 8, wherein the main belt layer has a belt ply including an organic fiber cord which comprises an aromatic polyamide cord and an aliphatic polyamide cord which are laid together, and in which an inner-layer coefficient of the aromatic polyamide cord is 0.12 to 0.85.

10. A pneumatic radial tire according to claim 1, wherein the main belt layer has a belt ply including an organic fiber cord which is spirally wound at an angle of substantially 0° with respect to the tire equator surface.

11. A pneumatic radial tire according to claim 1, wherein the main belt layer has a belt ply including organic fiber cords which are inclined at an angle of 2 to 25° with respect to the tire equator surface and which are bent within the same plane such that the organic fiber cords are inclined in opposite directions from each other at each ply end and which extend in a circumferential direction of the tire in a zigzag form.

12. A pneumatic radial tire according to claim 1, wherein the auxiliary belt layer has a belt ply including an organic fiber cord which is inclined at an angle of 2 to 45° with respect to the tire equator surface.

13. A pneumatic radial tire according to claim 1, wherein the auxiliary belt layer has a belt ply including organic fiber cords which are bent within the same plane such that the organic fiber cords are inclined in opposite directions from each other at each ply end and which extend in a circumferential direction of the tire in a zigzag form.

14. A pneumatic radial tire according to claim 1, wherein the carcass layer includes at least two carcass plies formed of an organic fiber cord, which has a tensile fracture strength of 6.3 cN/dtex or higher, an elongation percentage of 0.2 to 1.8% when 0.2 cN/dtex load is applied in an elongating direction, an elongation percentage of 1.4 to 6.4% when 1.9 cN/dtex load is applied in the elongating direction, and an elongation percentage of 2.1 to 8.6% when 2.9 cN/dtex load is applied in the elongating direction.

15. A pneumatic radial tire according to claim 14, wherein the carcass layer has a carcass ply including an organic fiber cord which is formed of aromatic polyamide fiber, and which has an inner-layer coefficient of 0.12 to 0.85 and an outer-layer coefficient of 0.4 to 0.85.

16. A pneumatic radial tire according to claim 15, wherein the organic fiber cord has an inner-layer coefficient of 0.17 to 0.51.

17. A pneumatic radial tire according to claim 14, wherein the carcass layer has a carcass ply including an organic fiber cord which includes aromatic polyamide fiber and aliphatic polyamide fiber, and a weight ratio of the aromatic polyamide fiber and the aliphatic polyamide fiber is from 100:12 to 100:510.

18. A pneumatic radial tire according to claim 17, wherein the organic fiber cord has a weight ratio of from 100:27 to 100:255.

19. A pneumatic radial tire according to claim 17, wherein the carcass layer has a carcass ply including an organic fiber cord which comprises aromatic polyamide organic fiber cord and aliphatic polyamide organic fiber cord which are laid together, and in which an inner-layer coefficient of the aromatic polyamide organic fiber cord is 0.12 to 0.85.

20. A pneumatic radial tire according to claim 19, wherein the inner-layer coefficient of the aromatic polyamide organic fiber cord is 0.17 to 0.51.

21. A pneumatic radial tire according to claim 1, wherein a protective belt layer is disposed at an outer side of the auxiliary belt layer in the radial direction of the tire via a rubber layer which is 1.5 to 4.5 mm thick, and the protective belt layer includes a non-metallic waved cord wavily extending in the circumferential direction of the tire and having a tensile strength of 1000 MPa or higher.

22. A pneumatic radial tire according to claim 21, wherein the waved cord has an amplitude of 5 to 25 mm and a wavelength of 200 to 700% of the amplitude in a state in which an internal pressure is not charged.

23. A pneumatic radial tire according to claim 1, wherein in a state in which a standard internal pressure defined in TRA is charged, a growth rate of a tire outer diameter is 0.3 to 5.5% as compared with a state before the internal pressure is charged.

* * * * *